United States Patent
Auer

(10) Patent No.: US 7,529,310 B2
(45) Date of Patent: May 5, 2009

(54) APPARATUS AND METHOD FOR ESTIMATING A CHANNEL

(75) Inventor: Gunther Auer, Munich (DE)

(73) Assignee: NTT DoCoMo, Inc., Tokyo (JP)

(*) Notice: Subject to any disclaimer, the term of this patent is extended or adjusted under 35 U.S.C. 154(b) by 746 days.

(21) Appl. No.: 10/967,044

(22) Filed: Oct. 15, 2004

(65) Prior Publication Data

US 2005/0047518 A1  Mar. 3, 2005

Related U.S. Application Data

(63) Continuation of application No. PCT/EP03/05376, filed on May 22, 2003.

(51) Int. Cl.
*H04L 1/02* (2006.01)
(52) U.S. Cl. .................. 375/267; 375/316; 375/347
(58) Field of Classification Search ........... 375/267, 375/285, 347, 349, 260, 316; 455/500, 501, 455/63.1; 370/210, 343, 480, 481, 491
See application file for complete search history.

(56) References Cited

U.S. PATENT DOCUMENTS

| | | | |
|---|---|---|---|
| 6,317,411 B1 * | 11/2001 | Whinnett et al. | 375/267 |
| 6,512,738 B1 * | 1/2003 | Namekata et al. | 370/210 |
| 7,221,722 B2 * | 5/2007 | Thomas et al. | 375/346 |
| 2002/0122381 A1 | 9/2002 | Wu et al. | 370/208 |

FOREIGN PATENT DOCUMENTS

WO  WO 2004/073276 A1  8/2004

OTHER PUBLICATIONS

Li, "Simplified Channel Estimation for OFDM Systems with Multiple Transmit Antennas," IEEE Transaction on Wireless Communications, 1:67-75 (2002).
International Preliminary Examination Report mailed May 11, 2004.
PCT Notification of Transmittal of the International Search Report or the Declaration dated May 22, 2003.
European Office Action dated Aug. 11, 2005.
Weinstein, et al., "Data Transmission by Frequency-Division Multiplexing Using the Discrete Fourier Transform," IEEE Transactions on Communication Technology 19:628-634 (1971).

(Continued)

Primary Examiner—Betsy L Deppe
(74) Attorney, Agent, or Firm—Edwards Angell Palmer & Dodge LLP; John J. Penny, Jr.

(57) ABSTRACT

An apparatus for estimating a channel from a transmitting point to a receiving point in an environment, in which at least two transmitting points spaced apart from each other are present, the transmitting point having associated therewith a pilot sequence, wherein the pilot sequences are different from each other, having a provider for providing an input signal, the input signal including a superposition of signals from the transmitting points, a multiplier for providing a number of copies of the input signal, the number of copies being equal to the number of transmitting points, for each copy of the input signal, a transformer for transforming the copy or a signal derived from the copy to obtain a transformed signal, the transformer being operative to apply a transform algorithm which is based on a Fourier transform, and for each transformed signal, an extractor extracting a portion of the transformed signal.

13 Claims, 6 Drawing Sheets

OTHER PUBLICATIONS

Fazel, et al., "*On the Performance of Convolutionally-Coded CDMA/OFDM for Mobile Communication System,*" pp. 468-472, (1993).

Atarashi, et al., "*Variable Spreading Factor Orthogonal Frequency and Code Division Multiplexing (VSF-OFCDM),*" Multi-Carrier Spread-Spectrum and Related Topics, pp. 113-122 (2002).

Gong, et al., "Low Rank Channel Estimation for Space-Time Coded Wideband OFDM Systems," IEEE, pp. 772-776 (2001).

Barhumi, et al., "*Optimal Training Sequences for Channel Estimation in MIMO OFDM Systems in Mobile Wireless Channels,*" IEEE pp. 44-1-44-6 (2002).

\* cited by examiner

APPARATUS AND METHOD FOR ESTIMATING A CHANNEL

CROSS-REFERENCE TO RELATED APPLICATION

This application is a continuation of copending International Application No. PCT/EP03/05376, filed May 22, 2003, which designated the United States, and is incorporated herein by reference in its entirety.

BACKGROUND OF THE INVENTION

1. Field of the Invention

The present invention is in the field of telecommunications and, in particular, in the field of channel estimation in a multiple input scenario, in which a receiver receives signals from more than one transmitting antenna.

2. Description of the Related Art

The steadily-increasing demand for high data rates necessary for today's and future mobile radio applications require high data rate techniques efficiently exploiting the available band width or, in other words, the achievable channel capacity. Therefore, multiple input multiple output (MIMO) transmission systems have achieved considerable importance in recent years. MIMO systems employ a plurality of transmitting points, each of the transmitting points having a transmit antenna, and a plurality of receiving points, each of the receiving points having a receiving antenna, to receive signals being transmitted by the multiple transmitting points through different communication channels. In MIMO techniques, where the signals impinging from several transmitter antennas need to be separated, space-time codes or special multiplexing methods are used.

The signals impinging on each receive antenna are the superposition of the signals from $N_T$ antennas, where $N_T$ denotes a number of transmitting points. This implies new challenges for channel estimation. Channel parameters, like a channel impulse response or a channel transfer function are required for subsequent processing of the received data. While the separation of the signals corresponding to several transmitting points, each of them having a transmit antenna, is a challenging task, the extension from a receiver having one antenna to a system with several receive antennas is straight forward, as long as the signals are mutually uncorrelated. The structure of the channel estimation units is independent of the number of receive antennas $N_R$. The extension from a multiple input single output (MISO) system to a MIMO system is to employ $N_R$ parallel channel estimation units, one for each receiving point (receive antenna).

The use of coherent transmission techniques in wireless systems requires estimation and tracking of the mobile radio channel. Since the signals transmitted from multiple transmit antennas are observed as mutual interference, channel estimation for MIMO systems is different from the single transmit antenna scenario. MIMO systems can be used with a multicarrier modulation scheme to further improve the communication capacity and quality of mobile radio systems. A prominent representative of multi-carrier modulation techniques is the orthogonal frequency division multiplexing. (OFDM) technique.

Multi carrier modulation in particular orthogonal frequency division multiplexing (OFDM) has been successfully applied to a wide variety of digital communication systems over the past several years. In particular for the transmission of large data rates in a broadcasting scenario (e.g. digital TV), OFDM's superior performance in transmission over dispersive channels is a major advantage. OFDM has been chosen for various digital broadcasting standards, e.g. DAB or DVB-T. Another wireless application of OFDM is in high speed wireless local area networks (WLAN).

OFDM was first introduced in the 1960s. An efficient demodulation utilising the discrete Fourier transform (DFT) was suggested by S. Weinstein and P. Ebert, "Data Transmission by Frequency Division Multiplexing Using the Discrete Fourier Transform", IEEE Transactions on Communication Technology, vol. COM-19, pp. 628-634, October 1971. By inserting a cyclic prefix into the guard interval (GI) longer than the maximum delay of the channel, inter-symbol interference (ISI) can be eliminated completely and the orthogonality of the received signal is preserved. Since future mobile communication systems should support data rates several times higher than current systems, multi-carrier systems with proper coding and interleaving offer both efficient implementation through the application of the Fast Fourier Transform (FFT) and sufficient robustness to radio channel impairments.

Another OFDM-based approach, termed multi-carrier code division multiplex access (MC-CDMA), were spreading in frequency direction as has been introduced in addition to the OFDM modulation, as described in K. Fazel and L. Papke, "On the Performance of Convolutionally-Coded CDMA/OFDM for Mobile Communication Systems", in Proc. IEEE Int. Symposium on Personal, Indoor and Mobile Radio Communications (PIMRC '93), Yokohama, Japan, pp. 468-472, September 1993. MC-CDMA has been deemed to be a promising candidate for the downlink of fourth generation systems. Moreover, a MC/CDMA system with a variable spreading factor has been proposed as described in H. Atarashi and M. Sawahashi, "Variable Spreading Factor Orthogonal Frequency and Code Division Multiplexing (VSF-OFCDM)", in $3^{rd}$ International Workshop on Multi-Carrier Spread-Spectrum & Related Topics (MC-SS 2001), Oberpfaffenhofen, Germany, September 2001.

A block diagram of an OFDM system is shown in FIG. 4. For OFDM-based MIMO systems, one OFDM modulator is employed on each transmitting point, while OFDM demodulation is performed independently for each receiving point. The signal stream is divided into $N_C$ parallel sub-streams. The $i^{th}$ sub-stream commonly termed $i^{th}$ sub-carrier of the $l^{th}$ symbol block (OFDM symbol) is denoted by $X_{l,i}$. After serial to parallel conversion (S/P) performed by a S/P converter 701 an inverse discrete Fourier transform (DFT) with $N_{FFT}$ points is performed by an IFFT transformer 703 on each block and, subsequently, the guard interval (GI) having $N_{GI}$ samples is inserted by a GI block 705 to obtain a signal $x_{l,n}$ after parallel to serial (P/S) conversion performed by a P/S converter 703. After digital to analogue (D/A) conversion, the signal x(t) is transmitted over a mobile radio channel with an impulse response h(t, τ). The received signal at receive antenna ν consists of superimposed signals from NT transmitting points. Assuming perfect synchronisation, the received signal impinging at receive antenna ν at sampling instants $t=[n+lN_{sym}]T_{spl}$ is obtained $$y_{l,n}^{(v)} \triangleq y^{(v)}\left([n+lN_{sym}]T_{spl}\right)$$
$$= \sum_{\mu=1}^{N_T} \int_{-\infty}^{\infty} h^{(\mu,v)}(t,\tau) \cdot x^{(\mu)}(t-\tau)\,d\tau + n(t) \Big|_{t=[n+lN_{sym}]T_{spl}}$$

where n(t) represents additive white Gaussian noise, and $Nsym=N_{FFT}+N_{GI}$ accounts for the number of samples per OFDM symbol. The signal $y_{l,n}$ received by the receiver is first serial to parallel (S/P) converted by a S/P converter 709 and the guard interval is removed by a GI block 711. The information is recovered by performing a discrete Fourier transform (DFT) on the received block of signal samples (in FIG. 4 a FFT transformer 713 is used) to obtain the output of the OFDM demodulation $Y_{l,I}$ in the frequency domain. The received signal at receive antenna ν after OFDM demodulation is given by $$Y_{l,i}^{(v)} = \sum_{\mu=1}^{N_T} X_{l,i}^{(\mu)} \cdot H_{l,i}^{(\mu,v)} + N_{l,i}$$

where $$X_{l,i}^{(\mu)}$$

and $$H_{l,i}^{(\mu,v)}$$

denotes the transmitted information symbol and the channel transfer function (CTF) of transmit antenna μ, at sub-carrier i of the $l^{th}$ OFDM symbol, respectively. The term $N_{l,i}$ accounts for additive white Gaussian noise (AWGN) with zero mean and variance $N_o$.

When transmitting an OFDM signal over a multi-path fading channel, the received signal will have unknown amplitude and phase variations. For coherent transmission, these amplitude and phase variations need to be estimated by a channel estimator.

In the following, reference is made to pilot symbol-aided channel estimation (PACE), where a sub-set of the transmitted data is reserved for transmitting known information, termed "pilot symbols". These pilots are used as side information for channel estimation.

To formally describe the problem, the received pilot of OFDM symbol $lD_t$ at the $(iD_f)^{th}$ sub-carrier $$Y_{lD_t,iD_f} = \sum_{\mu=1}^{N_T} X_{lD_t,iD_f}^{(\mu)} H_{lD_t,iD_f}^{(\mu)} + N_{lD_t,iD_f} \quad \begin{array}{l} \tilde{l} = \{1, 2, \ldots, L/D_t\} \\ \tilde{i} = \{1, 2, \ldots, N_c/D_f\} \end{array}$$

where $$X_{iD_t,iD_f}^{(\mu)}$$

and $$H_{iD_t,iD_f}^{(\mu,v)}$$

denotes the transmitted pilot symbol and the channel transfer function (CTF) of transmit antenna μ, at sub-carrier i=$\tilde{i}D_f$ of the $l=\tilde{l}D_t^{th}$ OFDM symbol, respectively. It is assumed that the CTF varies in the l and in the i variable, i.e. in time and in frequency. The term $N_{lD_t,iD_f}$ accounts for additive white Gaussian noise. Furthermore, l represents the number of OFDM symbols per frame, $N_c$ is the number of sub-carriers per OFDM symbol, $D_f$ and $D_t$ denote the pilot spacing in frequency and time, and $N_T$ is the number of transmit antennas. The goal is to estimate $$H_{l,i}^{(\mu)}$$

for all {l,i,μ} within the frame $Y_{l,i}$ is measured. Additionally, the symbols $$X_{l,i}^{(\mu)}$$

at the location (l,i)=($\tilde{l}D_t$, $\tilde{i}D_f$) are known at the receiver. The channel estimation now includes several tasks:
1. The separation of $N_T$ superimposed signals,
2. Interpolation in case that $D_t$ or $D_f$ are larger than one, and
3. Averaging over the noise $N_{lD_t,iD_f}$ by means of exploiting the correlation of $$H_{lD_t,iD_f}^{(\mu,v)}.$$

In order to estimate $$H_{l,i}^{(\mu)}$$

given $Y_{lD_t,iD_f}$ there are $N_c$ equations with $N_cN_T$ unknowns, when one OFDM symbol is considered. Thus, a straightforward solution of this linear equation system does, in general, not exist. By transforming $Y_{lD_t,iD_f}$ to the time domain, the number of unknowns can be reduced, making it possible to solve the resulting equation system in the time domain. This approach has the advantage that DFT-based interpolation, which is a standard technique, can be combined with estimation and separation of $N_T$ superimposed signals in one step, resulting in a computationally efficient estimator.

For time domain channel estimation for MIMO-OFDM systems, the received pilots of one OFDM symbol $Y_{lD_t,iD_f}$ are pre-multiplied by the complex conjugate of the transmitted pilot sequence $X^*_{lD_t,iD_f}$ for $1 \leq \tilde{i} \leq N'_p$. Then the result is transformed into the time domain via an $N'_p$-point IDFT. Subsequently, the $N_T$ superimposed signals are separated by a matrix inversion. The time domain channel estimate is obtained by filtering the output of the IDFT operation with a finite impulse response (FIR) filter. The DFT-based interpolation is performed simply by adding $N_c$-Q zeros for the channel impulse response (CIR) estimates, i.e. to extend the length of the estimate of length Q to $N_c$ samples. This technique is called of zero padding. An $N'_p$-point DFT transforms the CIR estimate of the pilots to the frequency response estimate of the entire OFDM symbol.

Estimators based on discrete Fourier transform (DFT) have the advantage that a computationally efficient transform in the form of the Fourier transform does exist and that DFT based interpolation is simple.

The performance of the estimation in general is dependent on the choice of the pilot symbols. It is desirable to chose a set of pilot sequences, which minimises the minimum mean squared error (MMSE) criterium (which is a measure of the performance) and the computational complexity of the estimator. Estimators based on the least squares (LS) and the MMSE criterion for OFDM-MIMO systems have been systematically derived by Y. Gong and K. Letaief in: "Low Rank Channel Estimation for Space-Time Coded Wideband OFDM Systems," in Proc. IEEE Vehicular Technology Conference (VTC' 2001-Fall), Atlantic City, USA, pp. 722-776, 2001.

I. Barhumi et al describe in: "Optimal training sequences for channel estimation in MIMO OFDM systems immobile wireless channels", International Zurich Seminar on Broadband Communications (IZS02), February, 2002 a channel estimation and tracking scheme for MIMO OFDM systems based on pilot tones. In particular, the authors describe a channel estimation scheme based on pilot tones being orthogonal and phase-shifted to each other. Although the pilot symbols described in the above-cited prior art allow an accurate channel estimation, an enormous computational complexity at the receiver is required in order to perform matrix inversions required by the channel estimation algorithm. Due to this high computational complexity, the estimation scheme described in the above prior art document cannot be implemented at low cost, so that the disclosed algorithm may not be suitable for mass-market mobile receivers.

Yi Gong at al. ("Low Rank Channel Estimation for Space-Time Coded Wideband OFDM systems", IEEE Vehicular Technology Conference, VTC 2001—Fall, vol. 2, pp. 772-776, September 2001) describe a channel estimation scheme with reduced complexity, wherein matrix inversions are avoided by applying pre-computed singular value decomposition in order to estimate the channel. However, the complexity of this approach is enormous since the singular value decomposition has to be calculated.

Y. Li, et ("Simplified Channel Estimation for OFDM Systems with Multiple Transmit Antennas," IEEE Transactions on Wireless Communications, vol. 1, pp. 67-75, January 2002), proposed a channel estimation scheme for OFDM with multiple transmit antennas which is based on the DFT transform. In particular, Li discloses a method for generating pilot symbols to be transmitted by multiple transmit and receive antennas and to be exploited at the receiver for channel estimation. These pilot symbols are generated by multiplying a training sequence having good timing and frequency synchronisation properties by a complex sequence introducing an additional phase shift between the pilot symbols and between the subsequent values of each pilot symbol, as well. To be more specific, each value of a training sequence is multiplied by a complex factor, which introduces a phase shift, wherein the phase shift is dependent of a number being assigned to the value being multiplied, on a number assigned to the corresponding transmitting point and a total number of transmitting points. The pilot symbols are orthogonal and phase shifted to each other. The pilot symbols are modulated by an OFDM scheme and transmitted through a plurality of communication channels. At a receiver, which is one of a plurality of receivers, a signal being received includes a super-position of the plurality of transmitted signals through the plurality of communication channels. Li et al presented further a design rule for the pilot tones based on phase-shifted sequences which is optimum in the mean squared error (MSE) sense. Moreover, a matrix inversion, which is, in general, required for the estimator, can be avoided by choosing orthogonal pilot sequences. However, due to a difficulty of obtaining perfect orthogonality between training sequences, matrix inversions may be necessary. Additionally, if the training sequences are non-orthogonal, then the channel estimation scheme proposed by Li becomes more complex since the paths corresponding to the communication channels cannot be separated in straight forward way.

FIG. 5 shows prior art channel estimation scheme as taught by Li, where the case of two transmitting antennas is considered.

The prior art channel estimator includes a plurality of multipliers, wherein FIG. 5 shows only three multipliers being associated with the $k^{th}$ value of a $n^{th}$ received sequence r[n,k]. A first multiplier 901, a second multiplier 903 and a third multiplier 905 arranged in parallel include first and second inputs and outputs, respectively. The output of the first multiplier 901 is connected to a first inverse fast Fourier transform (IFFT) block 907, the output of the second multiplier 903 is connected to a second IFFT block 909 and the output of the third multiplier 905 is connected to the third IFFT block 911. It should be mentioned here that in total, K multipliers are connected to each IFFT block, wherein K denotes a length of a received sequence in the frequency domain, and a total number of 3K input signals are provided to the three IFFT blocks. Each of the IFFT blocks 907, 909 and 911 is operative to perform an inverse fast Fourier algorithm applied to K input values, respectively. Furthermore, each of the IFFT blocks 907, 909 and 911 includes a number of outputs, wherein only the first $K_0$ outputs of each IFFT block are used. The respective remaining outputs are, for example, connected to ground.

$K_0$ outputs of the first IFFT block 907 are connected to a first estimation block 913 and the first $K_0$ outputs of the third IFFT block 911 are connected to a second estimation block 915. The $K_0$ outputs of the second IFFT block 909 are connected to the first estimation block 913 and to the second estimation block 915, respectively. The first estimation block 913 and the second estimation block 915 have $K_0$ outputs, each of the outputs being connected to a corresponding filter 917 of a plurality of filters, each of the filters having an output, respectively. The $K_0$ outputs of the filters 917 corresponding to the first estimation block 913 are connected to a first Fourier transform (FFT) block 917 and the $K_0$ outputs of the filter 917 corresponding to the second estimation block 915 are connected to a second FFT block 921. The first FFT block 919 and the second FFT block 921 have K outputs, where K is, as stated above, the number of sub-carriers. Furthermore, due to the simplified algorithm described by Li, the outputs of the first filters 917 corresponding to the first estimation block 913 are connected to the second estimation block 915 and the outputs of the filter 917 corresponding to the second estimation block 915 are further connected to the first estimation block 913, so that a plurality of feedback loops is established.

As stated above, FIG. 5 shows an example of the prior art estimator for the case of two transmit antennas, so that the received signal r[n,k] is a superposition of two transmitted signals being possibly corrupted by channel noise. The received signal is split into two received signals by a splitting means not shown in FIG. 5. The copies of the received signals are then multiplied by complex conjugated signals corresponding to the respective transmit antennas. Moreover, the pilot symbol transmitted by the first transmit antenna is multiplied by a complex conjugated version of the pilot symbol transmitted by the second antenna. More precisely, the K values of the first copy of the received signal are multiplied by K values of the complex conjugated version of the pilot symbol transmitted by the first antenna. The K values of the second version of the received signal is multiplied by K values of the complex conjugated version of the pilot symbol transmitted by the second transmit antenna. Furthermore, the K values of the pilot symbol transmitted by the first antenna is multiplied by K complex conjugated values of the pilot symbol transmitted by the second transmit antenna in order to obtain intermediate values required by the subsequent channel estimation algorithm.

As stated above, all multiplications are performed in parallel, so that the K results from the multipliers 901 are fed to the first IFFT block 907. K results from the K multipliers 903 are fed to the second IFFT block 909. K results from the K multipliers 905 are fed to the third IFFT block 911. Each respective IFFT block is operative to perform an inverse fast Fourier transform in order to transform the frequency domain input signals into time domain output signals.

The first and the second estimation block, 913 and 915, are operative to perform a channel estimation algorithm based on the plurality of the input signals. More precisely, the first estimation block 913 receives $3K_0$ input signals to generate $K_0$ output signals corresponding to the channel impulse response of the first channel from the first transmit antenna to the considered receive antenna. The second estimation block 915 receives, in an analogue way, $3K_0$ input signals to generate $K_0$ output values corresponding to the second communication channel from the second transmit antenna to the receive antenna. The respective $K_0$ output values are then filtered by filters 917.

As stated above, the respective output signals from the filters are fed back to the first and second channel estimation blocks 913 and 915, since the channel estimation blocks 913 and 915 are operative to estimate the channel impulse response of the respective communication channels based on previously-calculated values and on current values obtained from the IFFT blocks. Each estimation block applies an estimation algorithm where matrix by vector multiplications instead of matrix inversions are performed in order to calculate desired channel impulse responses. After filtering and zero padding to a length required by the following fast Fourier transform, a channel transfer function of the first and of the second communication channels are obtained.

As stated above, Li avoids matrix inversions by introducing an iterative scheme where matrix by vector multiplications appear and by exploiting the orthogonality of the pilot symbols. However, in order to calculate two channel impulse responses corresponding to the two communication channels, three inverse fast Fourier transforms and 3K multipliers are required. Moreover, the channel estimation algorithm applied by Li has still a high complexity due to the required matrix by vector multiplications. Hence, with an increasing number of transmit antennas, the complexity of the complicated estimation scheme proposed by Li rapidly increases due to the high number of complex valued multiplications. In addition, the multiplication of the two pilot symbols followed by an inverse Fourier transform is necessary in order to provide a plurality of intermediate values required for channel estimation. Hence, the estimation blocks 913 and 915 cannot operate independently, so that additional timing and control operations are necessary.

SUMMARY OF THE INVENTION

It is an object of the present invention to provide an improved concept for channel estimation with reduced complexity.

In accordance with a first aspect, the present invention provides an apparatus for estimating a channel from a transmitting point to a receiving point in an environment, in which at least two transmitting points spaced apart from each other are present, each transmitting point having associated therewith a pilot sequence, wherein the pilot sequences are different from each other, having: a provider for providing an input signal, the input signal including a superposition of signals from the transmitting points; a multiplier for providing a number of copies of the input signal, the number of copies being equal to the number of transmitting points; for each copy of the input signal, a transformer for transforming the copy or a signal derived from the copy to obtain a transformed signal, the transformer being operative to apply a transform algorithm, which is based on a Fourier transform; and for each transformed signal, an extractor extracting a portion of the transformed signal to obtain an estimated channel impulse response for the channel to be estimated, wherein each extractor is operative to receive a transformed signal only from an associated transformer.

In accordance with a second aspect, the present invention provides an apparatus for estimating a channel from a transmitting point to a receiving point in an environment, in which at least two transmitting points spaced apart from each other are present, each transmitting point having associated therewith a pilot sequence, wherein the pilot sequences are different from each other, having: a provider for providing an input signal, the input signal including a superposition of signals from the transmitting points; a transformer for transforming the input signal or a copy of the input signal to obtain a transformed signal, the transformer being operative to apply a transform algorithm, which is based on a Fourier transform; a multiplier for providing a number of copies of the transformed signal, the number of copies being equal to the number of transmitting points; for each copy of the transformed signal, an extractor extracting a portion of the copy of the transformed signal to obtain an estimated channel impulse response for the channel to be estimated.

In accordance with a third aspect, the present invention provides a method for estimating a channel from a transmitting point to a receiving point in an environment, in which at least two transmitting points spaced apart from each other are present, each transmitting point having associated therewith a pilot sequence, wherein the pilot sequences are different from each other, having the following steps: providing an input signal, the input signal including a superposition of signals from transmitting points; providing a number of copies of the input signal, the number of copies being equal to the number of transmitting points; for each copy of the input signal, transforming the copy or a signal derived from the copy to obtain a transformed signal by applying a transform algorithm, which is based on a Fourier transform; and for each transformed signal, extracting a portion of the transformed signal to obtain an estimated channel impulse response for the channel to be estimated, wherein only an associated transformed signal is received.

In accordance with a fourth aspect, the present invention provides a method for estimating a channel from a transmitting point to a receiving point in an environment, in which at least two transmitting points spaced apart from each other are present, each transmitting point having associated therewith a pilot sequence, wherein the pilot sequences are different from each other, having the following steps: providing an input signal, the input signal including a superposition of signals from transmitting points; transforming the input signal or a signal derived from the input signal to obtain a transformed signal by applying a transform algorithm, which is based on a Fourier transform; providing a number of copies of the transformed signal, the number of copies being equal to the number of transmitting points; and for each copy of the transformed signal, extracting a portion of the copy transformed signal to obtain an estimated channel impulse response for the channel to be estimated.

In accordance with a fifth aspect, the present invention provides a computer program having a program code for performing the method for estimating a channel from a transmitting point to a receiving point in an environment, in which at least two transmitting points spaced apart from each other are present, each transmitting point having associated therewith a pilot sequence, wherein the pilot sequences are different from each other, having the following steps: providing an input signal, the input signal including a superposition of signals from transmitting points; providing a number of copies of the input signal, the number of copies being equal to the number of transmitting points; for each copy of the input signal, transforming the copy or a signal derived from the copy to obtain a transformed signal by applying a transform algorithm, which is based on a Fourier transform; and for each transformed signal, extracting a portion of the transformed signal to obtain an estimated channel impulse response for the channel to be estimated, wherein only an associated transformed signal is received, or the method for estimating a channel from a transmitting point to a receiving point in an environment, in which at least two transmitting points spaced apart from each other are present, each transmitting point having associated therewith a pilot sequence, wherein the pilot sequences are different from each other, having the following steps: providing an input signal, the input signal including a super-position of signals from transmitting points; transforming the input signal or a signal derived from the input signal to obtain a transformed signal by applying a transform algorithm, which is based on a Fourier transform; providing a number of copies of the transformed signal, the number of copies being equal to the number of transmitting points; and for each copy of the transformed signal, extracting a portion of the copy transformed signal to obtain an estimated channel impulse response for the channel to be estimated, when the program runs on a computer.

The present invention is based on the finding that a channel estimation scheme based on Fourier transform can be simplified by efficiently exploiting the properties of the Fourier transform. In particular, it has been found that a transform based on a Fourier transform, for example a Fourier transform or an inverse Fourier transform, provides an estimated channel impulse response of a communication channel extending from a transmitting point of a plurality of transmitting points to a receiving point, if the transmitting points transmit different pilot sequences for channel estimation at the receiving point. In particular, if the pilot sequences are orthogonal and phase shifted to each other, then a transform based on a Fourier transform directly provides an estimated channel response of a channel to be estimated.

For example, in an environment, in which at least two transmitting points transmit pilot sequences for channel estimation, a signal received at the receiving point includes a superposition of the signals transmitted by the respective transmitting points, wherein the signal received at the receiving point may be both: a time domain signal belonging to a single carrier modulation scheme or a frequency domain signal belonging to a multicarrier modulation scheme, e.g. OFDM.

Since the pilot sequences are different from each other and the transmitting points are spaced apart from each other in order to, for example, exploit positive characteristics of a space diversity transmission scheme, an input signal provided by a provider, which may include an antenna, a filter applied to the signal received at the receiving point etc., includes a superposition of signals from the transmitting points, each of the signal being transmitted through a respective communication channel.

For the above considered case of two transmitting points transmitting information, the input signal includes a superposition of two signals transmitted through two physical channels having possibly different characteristics. If the input signal is multiplied in such a way that it is split or divided into two possibly identical copies, wherein in general a number of copies is equal to a number of transmitting points, then each copy of the input signal includes an associated pilot sequence information, i.e. the respective phase shift overlaid by a channel information associated with a channel the respective pilot sequence was transmitted through.

Each copy of the input signal is then pre-multiplied by a signal derived from a training sequence associated with a channel to be estimated. Hence, if each copy of the input signal is transformed by a transformer based on a Fourier transform which efficiently exploits the phase information of the particular pilot sequence, then a transformed signal provided by the transformer applied to the copy of the input signal includes a channel impulse response of the first channel, and the transformer applied to a further copy of the input signal includes a further channel impulse response of a further communication channel.

While the estimator disclosed by Li at al. requires a plurality of additional Fourier transforms in order to compute the intermediate values required for the channel estimation scheme, only one IDFT operation per communication channel is required in order to estimate the channel impulse response which simplifies the receiver structure and reduces the complexity of the inventive channel estimation scheme. Moreover, the improvement of the proposed receiver structure compared to the prior art receiver structure has no negative effects on the performance of the channel estimator.

Furthermore, due to the inventive channel estimation scheme, significantly less multiplications have to be performed which leads to a further complexity reduction since no pilot sequence by pilot sequence multiplication have to be performed in order to obtain intermediate results.

Additionally, the inventive channel estimation scheme is simplified in comparison with the prior art channel estimation schemes since the transformed signal already contains an estimate of the channel impulse response to be estimated. Therefore, no matrix inversions or matrix by vector multiplications are necessary which further reduces the complexity of the receiver structure.

Moreover, the inventive channel estimation scheme can be applied to any of orthogonal sequences having different phase shifts to each other provided that these phase shifts are known at the receiving point, since the respective transformer for providing a particular channel's estimate can efficiently be adjusted to the phase shift of the pilot sequence transmitted through the channel to be estimated.

The inventive approach can further be applied to channel estimation in any transmission systems, i.e. in multiple access transmission systems, like frequency division multiple access or time division multiple access systems.

BRIEF DESCRIPTION OF THE DRAWINGS

Further embodiments of the present invention are described in detail with respect to the following figures, in which.

DESCRIPTION OF PREFERRED EMBODIMENTS

Figure 1:
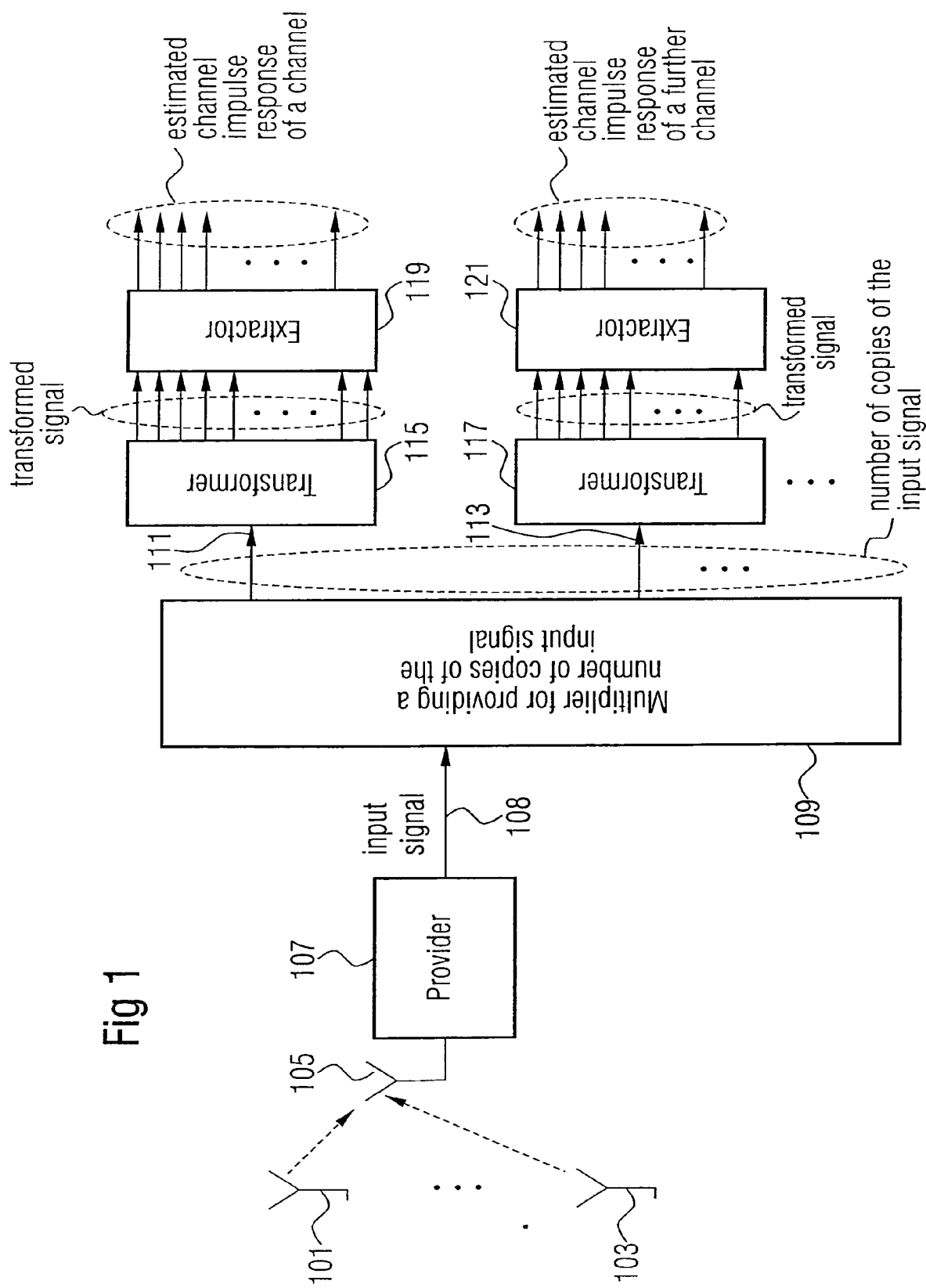
FIG. 1 shows a block diagram of an inventive apparatus for estimating a channel in accordance with a first embodiment of the present invention.

In FIG. 1 a block diagram of an inventive apparatus for estimating a channel is shown, wherein the apparatus is embedded in a multiple output scenario characterized by a plurality of transmit antennas. For the sake of clarity FIG. 1 shows only two transmit antennas, 101 and 103.

The apparatus shown in FIG. 1 comprises a receive antenna 105 having an output connected to a provider 107. The provider 107 has an output connected to a multiplier 109 for providing a number of copies of the input signal. The multiplier 109 has a number of outputs, the number corresponding to a number of copies to be provided or, in other words, corresponding to a number of transmitting points. For the sake of simplicity, only an output 111 and a further output 113 of the multiplier 109 are depicted in FIG. 1.

The output 111 is connected to a transformer 115, and the further output 113 is connected to a transformer 117. Each of the transformers 115 and 117 has a number of outputs corresponding to a transform performed by the respective transformer or, more precisely, corresponding to a transform length. The number of outputs of the transformer 115 is connected to an extractor 119, and the number of outputs of the transformer 117 is connected to an extractor 121. The extractor 119 and the extractor 121 have a number of outputs, wherein the number of outputs of the respective extractor 119 or 121 is equal to or preferably smaller than the number of outputs of the respective transformer 115 and 117.

The receive antenna 105 receives analogue signals from the plurality of transmitting points. Hence, the input signal includes a superposition of signals from the plurality of transmitting points. The provider 107 performs for example a filtering, analogue-to-digital conversion, demodulation or the like, so that the input signal provided at the output 108 of the provider 107 is a discrete time or frequency domain signal depending on the underlying demodulation scheme. For example, if an OFCM modulation scheme is used, then the input signal provided at the output 108 is a frequency domain signal. On the contrary, if a single carrier modulation scheme is used, then the input signal provided at the output 108 is a time domain signal.

The multiplier 109 receives the input signal via the output 108 and provides a number of copies of the input signal, wherein the number of copies is equal to the number of transmitting points as described above. The multiplier 109 may for example be operative to generate the number of exact copies of the input signal and to provide the number of paths corresponding to the number of transmitting points, wherein each path is associated with one copy of the input signal.

Preferably, for each copy of the input signal, a transformer for transforming the copy or for transforming a signal derived from the copy is applied. In FIG. 1 the copy provided at the output 111 is only received by the transformer 115, and the copy of the input signal provided via the output 113 (further copy) is only received by the transformer 117. In other words, the transformer 115 is assigned only to the copy of the input signal provided by the output 111 and the transformer 117 is assigned only to the further copy of the input signal provided by the output 113. Moreover, as depicted in FIG. 1, the transformers 115 and 117 operate independently from each other.

The transformer 115 provides via the number of outputs a transformed signal corresponding to a communication path between a transmitting point and the receiving point, and the transformer 117 provides via the number of outputs a transformed signal corresponding to a further communication path between a further transmitting point and the receiving point. Hence, the transformer 115 applies a transform algorithm which is based on a Fourier transform to the copy of the input signal or to a signal derived from the copy of the input signal (by for example a pre-multiplication) and the transformer 117 applies a transform algorithm based on the Fourier transform the further copy of the input signal or to a signal derived from the further copy of the input signal in order to obtain transformed signals.

The transformer 115 and the transformer 117 may be operative to perform a Fourier transform, a discrete Fourier transform, a fast Fourier transform, an inverse Fourier transform, an inverse discrete Fourier transform or an inverse fast Fourier transform. In general, the plurality of transformers applied to transforming the signals provided by the multiplier are operative to perform a transform algorithm transforming phase shifts of the particular training sequence such that a particular channel information may be retrieved. This can be performed by transforming phase shifts into delays, which is an inherent property of the algorithms based on Fourier transform.

The inventive channel estimation scheme is based on separate processing of each path corresponding to a respective copy of the input signal, wherein the number of paths corresponds to the number of transmitting points or to the number of communication channels to be estimated. Moreover, the inventive channel estimation scheme requires only one transformer per communication channel to be estimated. In other words, if $N_T$ transmitting points transmit pilot sequences for estimating of $N_T$ communication channels, then at most $N_T$ transformers are necessary for providing the channel estimates. Since the respective transformers may operate independently, the channel estimates are provided without using any intermediate values. To be more specific, in order to estimate a particular communication channel, only one transformer and additionally only the knowledge of the pilot sequence associated wit the corresponding channel (channel impulse response) to be estimated is required. In contrast to the prior art channel estimation scheme, neither cross connects between the transformers nor intermediate results obtained from a combination of training sequences are necessary.

For each transformed signal, an associated extractor extracting a portion of the transformed signal is applied to obtain an estimated channel impulse response for the channel to be estimated. In FIG. 1, the extractor 119 extracts a portion of the transformed signal provided by the transformer 115, and the extractor 121 extracts a portion of the transformed signal provided by the transformer 117. Extracting the portion of respective transformed signal means that only a subset of discrete values provided by the respective transformer 115 and 117 is further used.

For example, the extractor 119 and 121 may be operative to extract a number of successive values from the respective transformed signal provided by the transformer 115 and 117, wherein the number of successive values can be determined from a pre-knowledge of the channel, for example from a pre-known channel length. In this case, the extractor 119 extracts a subset from the corresponding transformed signal, the subset being no longer than the channel length of the channel to be estimated. However, the pre-knowledge of the channel may be a channel energy. In this case, the extractor 119 extracts a subset of the transformed signal, such that the subset extracted from the transformed signal has an energy which is greater than for example 80% of the channel energy. The remaining discrete values of the respective transformed signal, which are not extracted, may be discarded by setting same, for example, to zero. The extractor 121 operates in exactly the same way.

Moreover, the extractors 119 and 121 may be operative to extract values from the respective transformed signal, wherein values are greater than a predetermined threshold. For example, the predetermined threshold determines a minimum magnitude of values to be extracted. The predetermined threshold may be obtained from a maximum magnitude value included in the transformed signal. For example, the predetermined threshold may be equal to 0.2 of the maximum magnitude value. Furthermore, if an energy criterion is used for extracting a portion of the transformed signal, the predetermined threshold may be chosen such that the discrete values included in the transformed signal being above the threshold have energy no smaller for example than 80% of the channel energy. Alternatively, the threshold may be chosen such that an energy of discarded values, i.e. values not to be extracted, is less than for example 20% of the channel energy. In order to perform a threshold operation, the extractor may further comprise a comparator for comparing the discrete values included in the respective transformed signal to the threshold.

As depicted in FIG. 1, the portion of the transformed signal extracted by the extractor 119 is an estimated channel impulse of the channel extending for example from the transmitting point 101 to the receiving antenna 105. The portion of the transformed signal provided by the extractor 121 is the estimated channel impulse response of the further channel extending for example from the transmit antenna 103 to the receive antenna 105. Clearly, each extractor is operative to receive a transformed signal only from an associated transformer. To be more specific, each extractor operates only on the transformed signal provided by the associated transformer so that the respective channel impulse estimate can separately be estimated especially when the pilot sequences used for channel estimation are orthogonal to each other within a predetermined orthogonality range and phase shifted to each other, so that the properties of Fourier transformed can efficiently be exploited. However, since a perfect orthogonality is difficult to achieve, it is allowable that an absolute value of an inner product of any two pilot sequences is greater than or equal to zero but preferably smaller than 0.2. Hence, the predetermined orthogonality range is defined by an interval having a first value equal to zero and a last value equal to 0.2.

Figure 6:
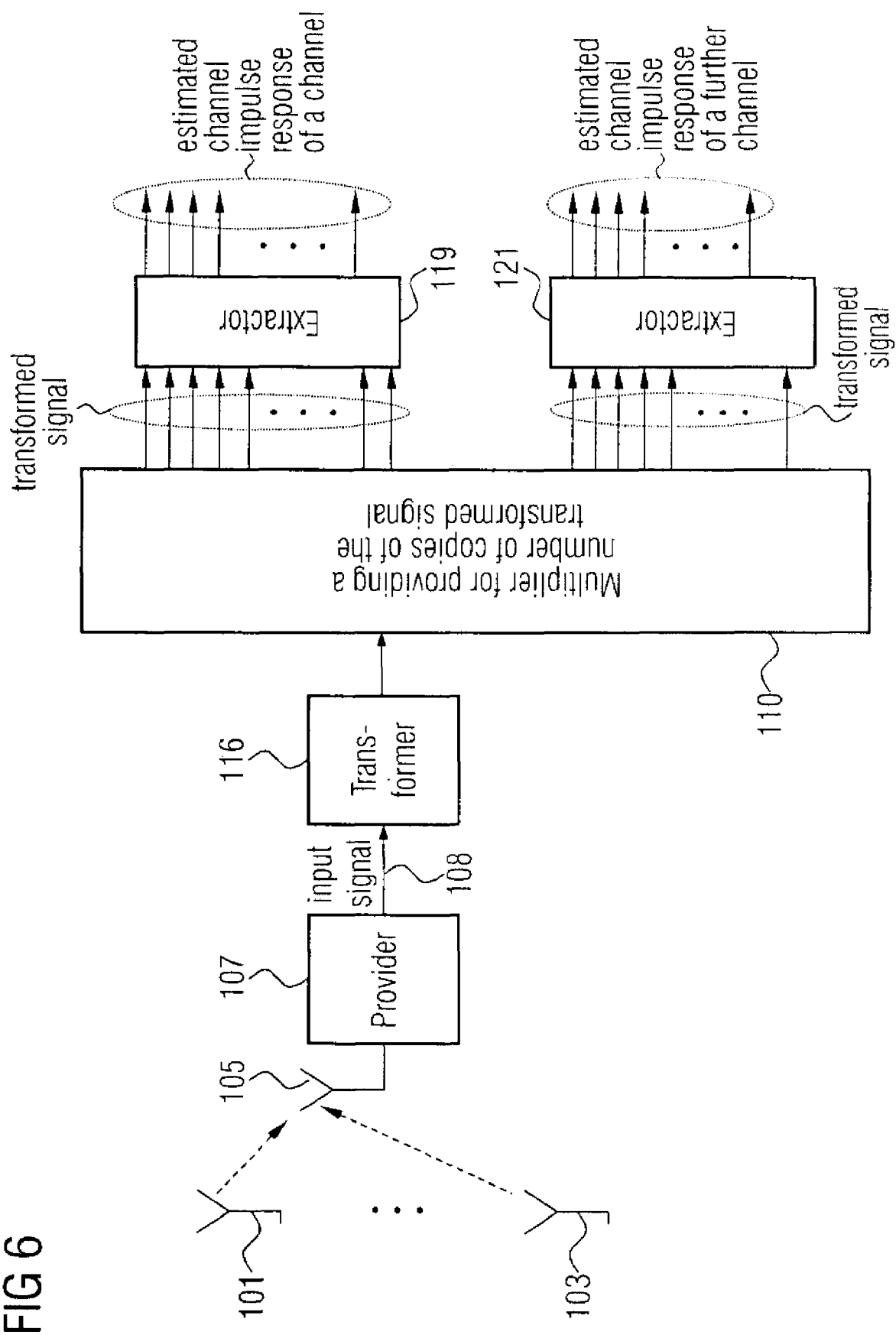
FIG. 6 shows a block diagram of an inventive apparatus for estimating a channel in accordance with a further embodiment of the present invention.

In accordance with a further embodiment of the present invention, the operations of multiplying and transforming may be interchanged. This embodiment is illustrated in FIG. 6. In this case, a transformer 116 transforms the input signal or a copy of the input signal to obtain a transformed signal by using a transform algorithm, which is based on a Fourier transform. Hereafter, a number a number of copies of the transformed signal may be provided by a multiplier 110, wherein the number of copies is preferably equal to the number of transmitting points. For each copy of the transformed signal, an extractor 119, 121 may be used for extracting a portion of the copy of the transformed signal to obtain an estimated channel impulse response for the channel to be estimated.

Figure 2:
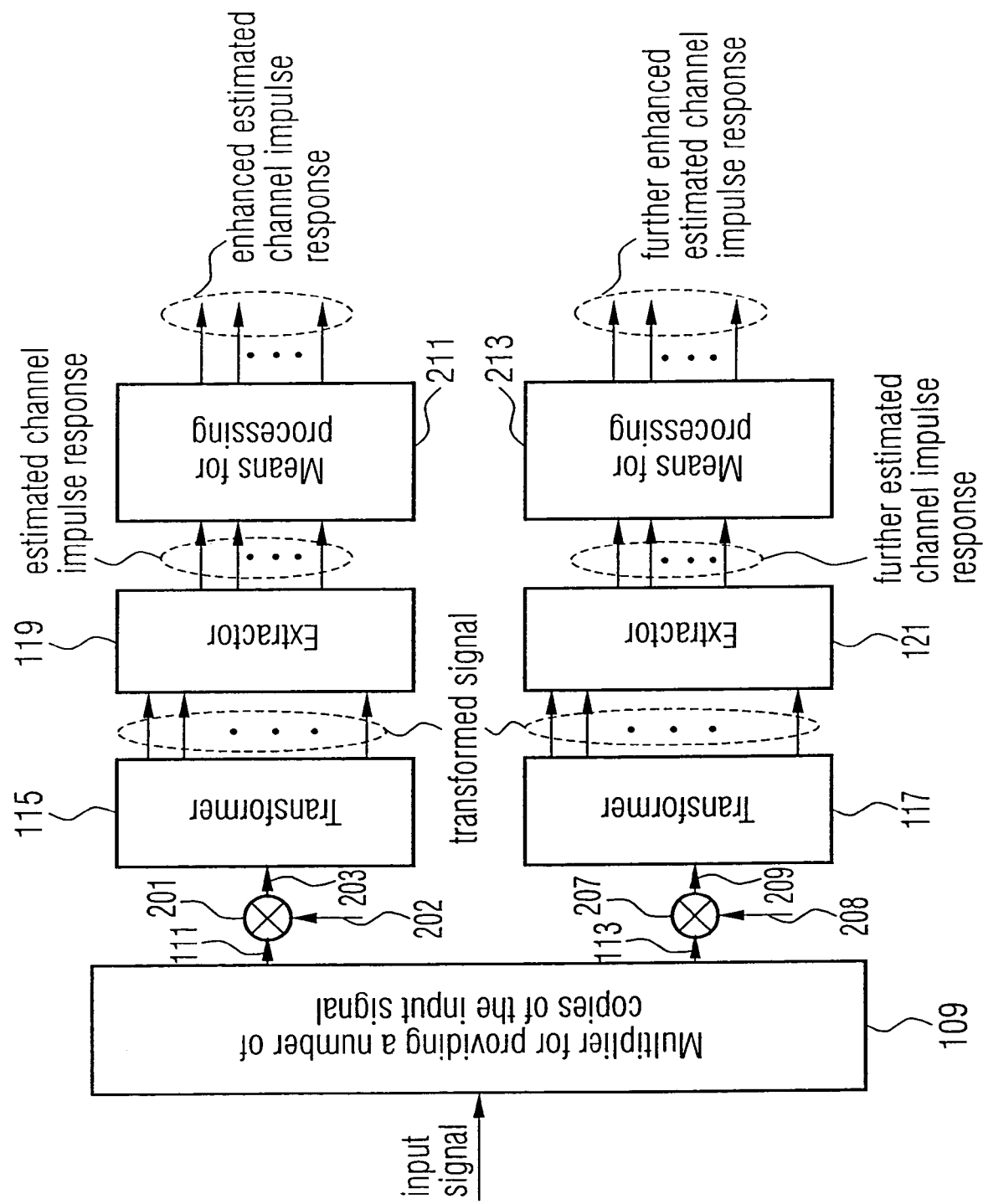
FIG. 2 shows a block diagram of a further apparatus for estimating a channel in accordance with a further embodiment of the present invention.

FIG. 2 shows an inventive apparatus for estimating a channel 35 in accordance with a further embodiment of the present invention, wherein again case of two transmitting points, i.e. two communication channels, is considered.

In contrast to the apparatus shown in FIG. 1, the apparatus shown in FIG. 2 comprises a pre-multiplier 201 having an input connected to the output 111 of the multiplier 109 and an output 203 connected to the transformer 115. Additionally, the pre-multiplier 201 has a further input 202. Furthermore, the apparatus shown in FIG. 3 comprises a pre-multiplier 207 having an input connected to the output 113 of the multiplier 109 and an output 209 connected to the transformer 117. Additionally, the pre-multiplier 207 has a further input 208.

In a further contrast to the embodiment shown in FIG. 1, the apparatus displayed in FIG. 2 includes a means 211 for processing connected to the outputs of the extractor 119, wherein the means 211 for processing has a number of outputs, the number of outputs being equal to or smaller than the number of outputs of the extractor 119. Additionally, the apparatus comprises a means 213 for processing connected to the extractor 121, wherein the means 213 has a number of outputs being equal or smaller than the number of outputs of the extractor 121. Clearly, the means 211 for processing is associated with a communication path and the means 213 for processing is associated with a further communication path.

In a further contrast to the apparatus shown in FIG. 1, the pre-multipliers 201 and 207 connected between the multiplier 109 and the respective transformer 115 and 117 are present. The path corresponding to the output 111 of the multiplier 109 provides a signal to be exploited for estimation of the communication channel, and the further path associated with the output 113 of the multiplier 109 provides a signal to be exploited for estimation of the further communication channel.

In particular, the pre-multiplier 201 is operative to pre-multiply the input signal, i.e. the copy thereof provided by the output 111, by a complex conjugate version of a pilot sequence associated with the transmitting point defining the channel to be estimated, wherein the complex conjugate version of the pilot sequence associated with the first transmitting point is provided to the multiplier 201 via the further input 202. However, in case that the pilot sequence is an all one sequence or if the coefficients of the pilot sequence vary only within a small range (i.e. smaller than 0.1 of a ratio between a maximum magnitude and a minimum magnitude), the pre-multiplier 201 may be bypassed by the input signal provided by the output 111 to the transformer 115.

However, since a plurality of different pilot sequences are transmitted, at least one pilot sequence has coefficients which are not all one. Hence, the pre-multiplier 207 pre-multiplies the input signal (the further copy thereof) provided via the output 113 by a complex conjugate version of a further pilot sequence associated with the further transmitting point defining the further channel to be estimated.

It should be noted here that the versions of pilot sequences provided to the respective pre-multiplier 201 and 207 must not necessarily be complex conjugate since the conjugation can be accounted during multiplications performed by the respective pre-multiplier 201 and/or 207. Moreover, instead of conjugating the respective pilot sequence, the respective copy of the input signal provided to the respective pre-multiplier my be conjugated, too, by for example introducing an additional conjugation means between the pre-multiplier 109 and the respective pre-multiplier 201 or 207. Moreover, the pre-multiplications may also be performed by the respective transformer or by the multiplier 109.

Moreover, foe example when the input signal belongs to an OFDM modulation scheme using M-ary QAM (M being greater than 4), the pre-multiplier 201 and 207 my be operative to pre-multiply the input signal (or copies thereof) provided via the outputs of the multiplier 109 by a version of an inverse of a pilot sequence associated with the channel to be estimated, wherein the version may be equal to the respective inverse or equal to a complex-conjugate version thereof. In this case, the inventive apparatus may further comprise a processing means for performing the necessary inversions. Alternatively, the pre-multiplier may be configured to perform the necessary divisions.

The pre-multiplied signal provided by the pre-multiplier 201 is provided to the transformer 115, and the pre-multiplied signal provided by the pre-multiplier 207 is provided to the transformer 117. The transformers 115 and 117 apply a single transform algorithm to the associated pre-multiplied signal, so that the extractor 119 and the extractor 121 are capable of extracting channel estimates from the respective transformed signals as described above.

In contrast to the apparatus displayed in FIG. 1, the apparatus shown in FIG. 2 further includes means for processing 211 and 213. The means for processing 211 is operative to provide an enhanced estimated channel impulse response based on the estimated channel impulse response provided by the extractor 119, and the means 213 for processing is operative to provide a further enhanced estimated channel impulse response based on the further estimated channel impulse response provided by the extractor 121. For example, the means 211 and 213 are operative to reduce an estimation error included in the respective estimated channel impulse response due to for example a possible channel noise.

It should be remarked that the means for processing as represented by the means 211 and 213 operate on the portion extracted by the associated extractor 119 and 121 without any knowledge of any further pilot sequence. The means 211 for processing may be operative only on information associated with the corresponding processing path, i.e. the means 211 does not need any information of the further pilot sequence associated with the further processing path and vice versa.

Each of the means for processing may further comprise a channel estimator, for example a minimum mean square error (MMSE) estimator, a least square (LS) estimator or a maximum likelihood (ML) estimator or further variations thereof. The respective means for processing an operative to reduce the channel noise corrupting the received channel estimates by providing a better—enhanced—estimates. The means for processing may perform a filter operation, i.e. Wiener filtering, wherein the filter coefficients are obtained from a MMSE criterion.

Moreover, the means for processing may perform a simple threshold operation thresholding the respective estimate of the channel input response so that coefficients of the respective channel estimate below the threshold are discarded and zeroed. For example, the threshold may be derived from an energy criterion similar to the one described above. Furthermore, the threshold operation may only be applied to a number of last coefficients of each channel estimate provided by the respective extractor in order shorten the length of the respective channel estimate.

Moreover, the means for processing as represented by means 211 and 213 may comprise an estimation filter as described above, wherein the estimation filter may iteratively be adjusted, and wherein the iterative adjust scheme is based on the portions extracted from the corresponding extractor at different time instants for iteratively outputting enhanced estimated channel impulse responses. For example, the means for processing may be operative to determine the filter coefficients iteratively on the basis of previously obtained enhanced channel estimates, so that current enhanced channel estimates may be provided. Moreover, the means for processing may be operative for channel tracking if the pilot sequences are only available at distinct time instants or if a number of successively transmitted pilot sequences from one transmitting point is too small for sufficient channel estimation.

In order to more precisely describe pilot symbol-assisted channel estimation, in the following a subset of the received signal will be defined containing only the pilots $$\{\tilde{Y}_{\tilde{l},\tilde{i}}^{(\mu)}\} = \{Y_{l,i}^{(\mu)}\}$$

with $\{i,l\} \in G$ sampled at $D_f$ times lower rate $\tilde{i} = \lfloor i/D_f \rfloor$ in frequency direction, and at $D_t$ times lower rate $\tilde{l} = \lfloor l/D_t \rfloor$ in time direction, respectively.

Considering the pilot sequence of OFDM symbol $l = \tilde{l} D_t$ from transmit antenna $\mu$ which can be expressed by a column size vector of size $N'_p$ $$\tilde{Y}'_{\tilde{l}} = \sum_{\mu=1}^{N_T} \tilde{X}_{\tilde{l}}^{\prime(\mu)} \tilde{H}_{\tilde{l}}^{\prime(\mu)} + \tilde{N}'_{\tilde{l}} \qquad \in C^{N'_p \times 1}$$

$$= \sum_{\mu=1}^{N_T} \tilde{X}_{\tilde{l}}^{\prime(\mu)} \tilde{F} I_{N'_p \times Q} \tilde{h}_{\tilde{l}}^{\prime(\mu)} + \tilde{N}'_{\tilde{l}}$$

where the transmitted pilot sequence, the channel transfer function (CTS) and additive noise term are given by $$\tilde{X}_{\tilde{l}}^{\prime(\mu)} = diag(\tilde{X}_{\tilde{l},1}^{(\mu)}, \cdots, \tilde{X}_{\tilde{l},N'_p}^{(\mu)}) \in C^{N'_p \times N'_p}$$

$$\tilde{H}_{\tilde{l}}^{\prime(\mu)} = [\tilde{H}_{\tilde{l},1}^{(\mu)}, \cdots, \tilde{H}_{\tilde{l},N'_p}^{(\mu)}]^T \in C^{N'_p \times 1}$$

$$\tilde{h}_{\tilde{l}}^{\prime(\mu)} = [\tilde{h}_{\tilde{l},1}^{(\mu)}, \cdots, \tilde{h}_{\tilde{l},Q}^{(\mu)}]^T \in C^{Q \times 1}$$

$$\tilde{N}'_{\tilde{l}} = [\tilde{N}_{\tilde{l},1}, \cdots, \tilde{N}_{\tilde{l},N'_p}]^T \in C^{N'_p \times 1}$$

The $N'_p \times N'_p$ DFT-matrix $\tilde{F}$ transforms the CIR into the frequency domain, defined by $$\{F\}_{i+1,n+1} = e^{-j2\pi n i/N'_p}; \; 0 \leq i \leq N'_p - 1, 0 \leq n \leq N'_p - 1$$

In case that $Q < N'_p$, the last $N'_p - Q$ of the DFT output need to be removed, which can be formally performed by the matrix $I_{N'_p \times Q} = [I_{Q \times Q}, 0_{N'_p - Q \times Q}]^T$ of dimension $N'_p \times Q$, with entries equal to 1 at the main diagonal and 0 elsewhere. For $Q = N'_p$, the matrix $I_{N'_p \times N'_p}$ becomes an identity matrix. In practice, the DFT transformation can be efficiently generated using a $N'_p$-point FFT. In case that $Q < N'_p$, the last $N'_p - Q$ outputs are skipped.

Hence, the flowing equation follows $$\tilde{Y}'_l = \tilde{X}'_l \tilde{H}'_l + \tilde{N}'_l = \tilde{X}'_l \tilde{F}_{N_T} \tilde{h}'_l + \tilde{N}'_l$$

where $$\tilde{X}'_l = [\tilde{X}'^{(1)}_l, \cdots, \tilde{X}'^{(N_T)}_l] \in C^{N'_P \times N_T N'_P}$$

$$\tilde{H}'_l = [\tilde{H}'^{(1)}_l, \cdots, \tilde{H}'^{(N_T)}_l]^T \in C^{N_T N'_P \times 1}$$

$$\tilde{h}'_l = [\tilde{h}'^{(1)}_l, \cdots, \tilde{h}'^{(N_T)}_l]^T \in C^{N_T Q \times 1}$$

$$\tilde{F}'_{N_T} = diag(\tilde{F} I_{N'_P \times Q}, \cdots, \tilde{F} I_{N'_P \times Q}) \in C^{N_T N'_P \times N_T Q}$$

For time domain channel estimation the transmitted pilot sequence $\tilde{X}'_l$ is pre-multiplied by $\tilde{Y}'_l$ and the result is transformed into time domain via for example a $N'_p$-point IDFT. These operations can mathematically be expressed as $$\xi_l \triangleq \frac{1}{N'_P}(\tilde{X}'_l \tilde{F}_{N_T})^H \tilde{Y}'_l \quad \in C^{N_T Q \times 1}$$

$$= \frac{1}{N'_P} \tilde{D}'^H_l \tilde{Y}'_l$$

$$= \frac{1}{N'_P} \tilde{D}'^H_l \tilde{D}'_l \tilde{h}'_l + \frac{1}{N'_P} \tilde{D}'^H_l \tilde{N}'_l$$

where the definition $\tilde{D}'_l = \tilde{X}'_l \tilde{F}_{N_T}$ has been introduced. The pre-multiplication with $1/N'_p \tilde{F}_{N_T}^H$ represents $N_T$ IDFT operations, one $N'_p$-point IDFT for each block of $\tilde{F}_{N_T}$.

The time domain channel estimate is obtained by filtering $\xi_l$ with the weighting matrix w, that is, $$\tilde{h}'_l = w \xi'_l$$

where $\tilde{h}'_l$ has the same structure as $\tilde{h}'_l$.

Figure 3:
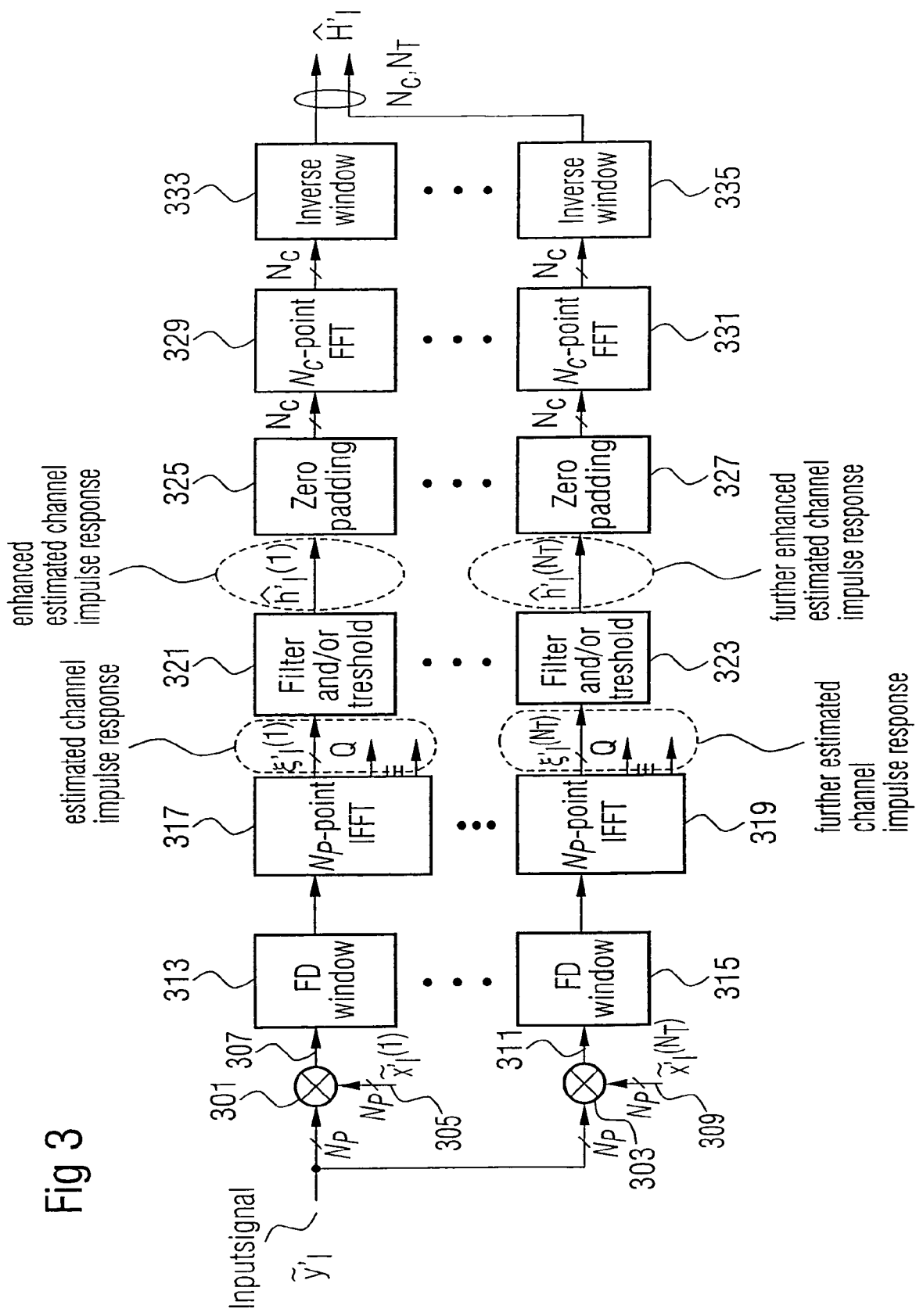
FIG. 3 shows a block diagram of an inventive apparatus for estimating a channel in accordance with a further embodiment of the present invention.
Figure 4:
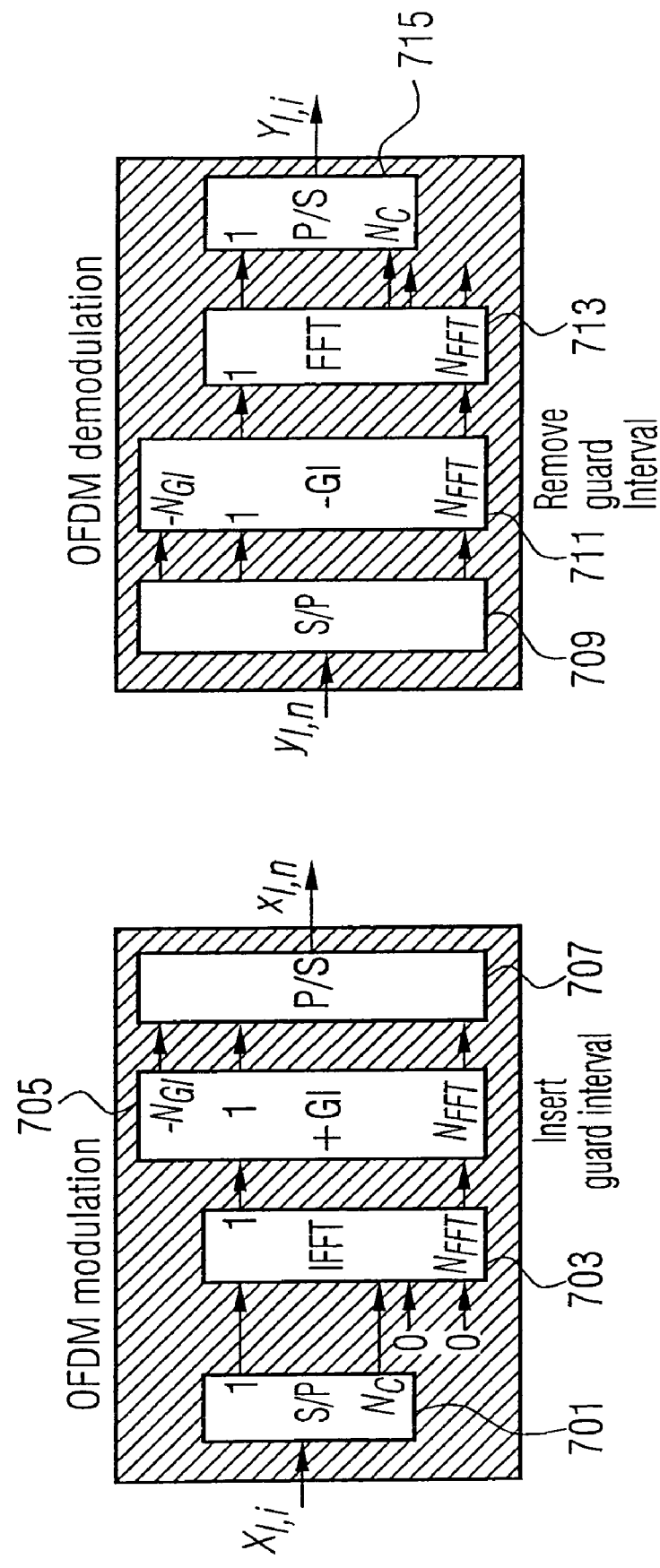
FIG. 4 demonstrates an OFDM modulation scheme.
Figure 5:
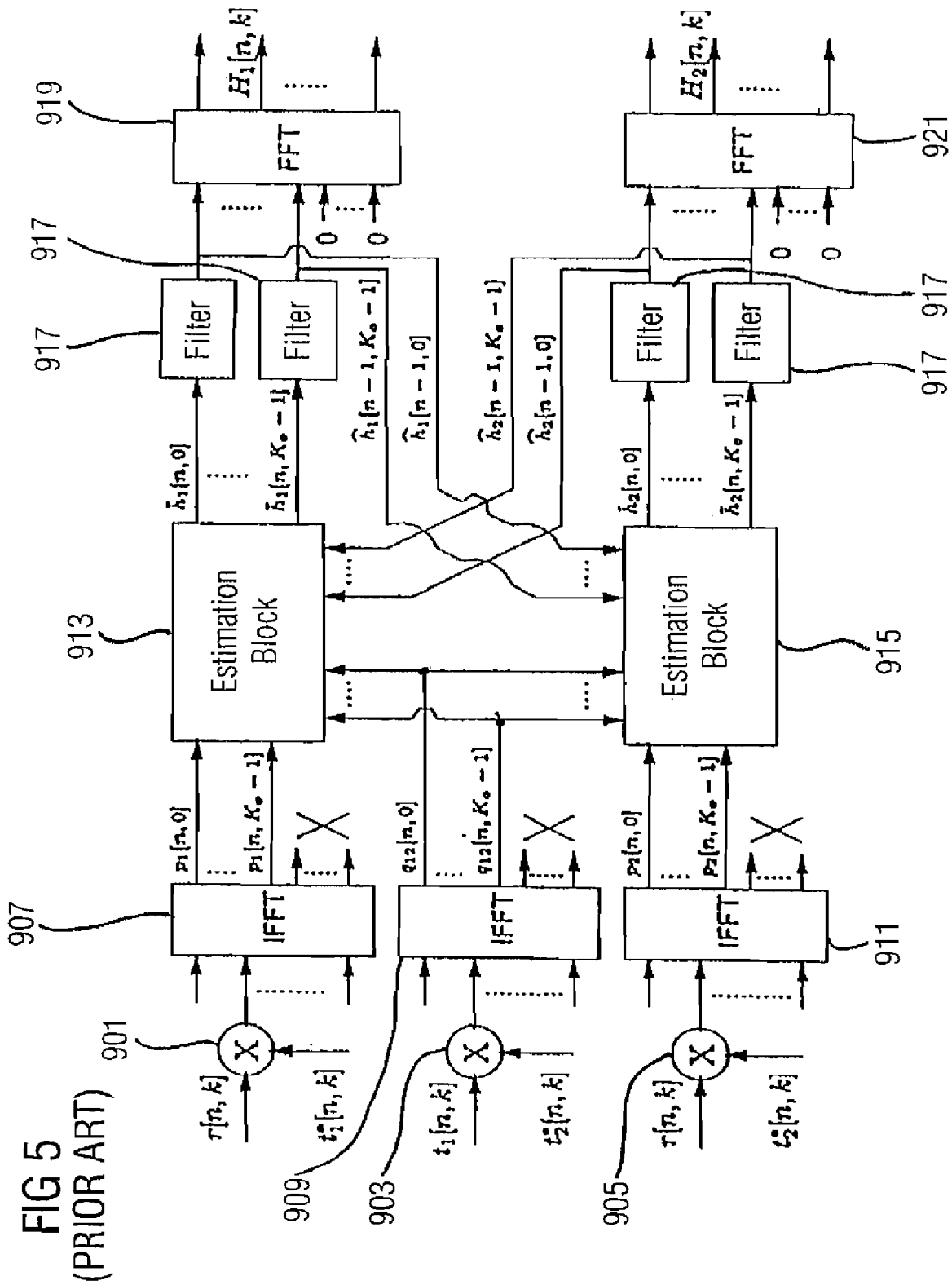
FIG. 5 shows a block diagram of a prior art channel estimation scheme.

Based on the above definitions, reference is made to FIG. 3 showing an inventive apparatus for estimating a channel in accordance with a further embodiment of the present invention.

In FIG. 3, a case is considered where a plurality of transmitting points transmit pilot sequences for estimation of a respective channel at the receiving point. For the sake of clarity, in FIG. 3 only two paths of $N_T$ paths corresponding to $N_T$ transmitting points and, hence, corresponding to $N_T$ communication channels are shown.

The input signal is provided by a multiplier not shown in FIG. 3. The multiplier has a plurality of outputs, wherein successive $N_p$ outputs are connected to a respective pre-multiplier. In accordance with the embodiment shown in FIG. 3, the first $N_p$ outputs corresponding to a communication path are connected to a pre-multiplier 301, and the last $N_p$ outputs corresponding to a further communication path are connected to a pre-multiplier 303. The pre-multiplier 301 has a further input 305 and an output 307. The pre-multiplier 303 has a further input 309 and an output 311.

Furthermore, the apparatus shown in FIG. 3 comprises $N_T$ frequency domain (FD) windows. In particular, a frequency domain window 313 is connected to the output 307 of the pre-multiplier 301 and a frequency domain window 315 is connected to the output 311 of the pre-multiplier 303. Each of the frequency domain windows has an output, wherein the output of the frequency domain window 313 is connected to a transformer 317, and the output of the frequency domain window 315 is connected to a transformer 319. The transformer 317 and the transformer 319 are operative to perform a $N_p$-point inverse Fourier transform (IFFT).

Instead of applying an extractor for extracting a number of outputs as discussed in connection with FIG. 2, first Q successive outputs of the transformer 317 are connected to the filter 321 and the remaining outputs are discarded. Accordingly, first Q successive outputs of the transformer 319 are connected to the filter 312 and the remaining outputs are discarded. In other words, the respective extractor is replaced by hardwiring the respective Q outputs to the filter 321 and to the filter 323.

The zero padder 325 has $N_C$ outputs connected to a FFT transformer 329 being operative to perform a $N_C$-point fast Fourier transform (FFT). The zero padder 327 has accordingly $N_C$ outputs connected to a FFT transformer 331 being operative to perform a $N_C$-point FFT.

The FFT transformer 329 has $N_C$ outputs connected to an inverse window 333 having a number of outputs, and $N_C$ outputs of the FFT transformer 331 are connected to an inverse window 335 having a number of outputs.

As shown in FIG. 3, each copy of the input signal is provided to an associated pre-multiplier. In particular, a copy of the input signal is provided to the multiplier 301, which pre-multiplies the copy by a signal derivable from a training sequence associated with the transmitting point defining a channel to be estimated.

Accordingly, a further copy of the input signal provided to the pre-multiplier 303, which is operative to pre-multiply the further copy of the input signal (consisting of $N_p$ discrete values) by a further training sequence associated with a further transmitting point defining a further channel to be estimated.

It should be noted here that each version of the corresponding pilot sequence may be a complex conjugate pilot sequence, as described above. The pre-multiplied signals generated by the pre-multiplier 301 and the pre-multiplier 309 are provided to the respective frequency domain window 313 and 315, each of the frequency windows being operative to perform a frequency windowing in order to reduce leakage effects due to the subsequent IFFT operation. For example, the frequency domain window 313 and 315 may formed for filtering the respective pre-multiplied signals in order to adjust the signals to be transformed such that leakage effects are reduced.

Subsequently, the IFFT transformers 317 and 319 independently perform an IFFT algorithm applied to the output signals provided by the frequency domain window 313 and the frequency domain window 315, respectively.

As described above, the filter 321 and 323 may be operative to perform a filtering in order to provide an enhanced estimated channel impulse response from the estimated channel impulse response and a further enhanced estimated channel impulse response from the further estimated channel impulse response by for example reducing an estimation error corrupting the respective channels estimate. For example, the filter 321 and 323 perform a MMSE, LS or ML estimation. Moreover, the filter 321 and 323 may be operative to perform a threshold operation as described above.

It should be noted here that the output signals of the IFFT transformers 317 and 319 can directly be applied to equalization of time domain or frequency domain signals. When for example the apparatus shown in FIG. 3 is applied to channel estimation in a single carrier transmission system. In time domain, for example a distributed feedback equalizer can be applied for equalization. Moreover, the channel estimate and the enhanced channel estimate contain channel state information which may be exploited for channel coding and channel decoding purposes.

In order to obtain a channel transform function corresponding to the respective estimated channel impulse response or to the respective enhanced estimated channel impulse response, a subsequent fast Fourier transform is applied to the enhanced estimated channel impulse response provided by the filter 321 and a fast Fourier transform is applied to the further enhanced estimated channel impulse response provided by the filter 323. Both transforms are performed in order to transform the particular enhanced channel estimate into frequency domain for obtaining a channel transfer function associated with the enhanced estimated channel impulse and for obtaining a further channel transfer function associated with the further enhanced estimated channel impulse.

Prior to performing the respective FFT each of the enhanced channel estimates is zero padded to a length required by the subsequent FFT performed by the respective IFFT transformer 329 and 331. To be more specific, the zero padder 325 extends a length of the enhanced estimated channel impulse response provided by the filter 323 such that an output signal provided by the zero padder 325 has a length equal to $N_C$ required by the subsequent FFT transform. A length of the further enhanced estimated channel impulse response provided by the filter 323 is extended in an analogue way, so that the zero padder 327 provides $N_C$ discrete values to the FFT transformer 331.

After the FFT transform, an inverse windowing is performed by the inverse window 333 and the inverse window 335 in order to reduce the effects (influence) caused by the frequency domain window 313 and by the frequency domain window 315.

It should be further noted here that the filter 321, the zero padder 325, the FFT transformer 329 and the inverse window 333 constitute a means for processing associated with the processing path and the filter 323, the zero padder 327, the FFT transformer 331 and the following inverse window 335 constitute a means for processing associated with the further processing path.

As described above, the received pilot sequence is pre-multiplied by $N_T$ pilot sequences, each sequence corresponding to a signal transmitted by a certain transmit antenna, followed by the transformation to the time domain via the IDFT. DFT based interpolation is performed simply by adding $N_C - Q$ zeroes to the channel impulse response estimate, extending the length of $\tilde{h}'_t$ to a number samples by means of zero padding, that is $$h'^{(\mu)}_{ID_t} = [\tilde{h}^{(\mu)}_{i,1}, \cdots, \tilde{h}^{(\mu)}_{i,Q}, 0, \cdots, 0]^T$$
$$= [\tilde{h}'^{(\mu)T}_i, 0, \cdots, 0]^T \quad \in C^{N_{FFT} \times 1}$$

wherein $h'^{(\mu)}_{ID_t}$ denotes a vector. By means of filtering the channel estimate may be improved in the time domain. An $N_C$-point DFT transforms the channel impulse response estimate of the pilots to the frequency response estimate of the entire OFDM symbol as considered in FIG. 3.

Provided that the channel impulse response is time limited, $\xi_t$ is strictly time limited and FFT based interpolation is simply performed by zero padding. It should be noted here that zero padding is required even for the case where the pilot spacing $D_f$ is equal to one since the number of outputs per transmit antenna is reduced by a factor of $N_T$.

The estimate of the channel transform function of an entire OFDM symbol (pilots and data) is obtained by a $N_C$-point FFT of the zero padded channel impulse estimate $$\hat{H}' = F_{N_T}\hat{h}' \text{ or } \hat{H}'^{(\mu)} = F\hat{h}'^{(\mu)}$$

where $F_{N_T}$ is a $N_T N_c \times N_T N_c$ block diagonal DFT matrix consisting of $N_T$ blocks of $N_c$- point DFT matrices F.

An efficient implementation of the DFT is the fast Fourier transform algorithm. For optimum efficiency, the number of points to the FFT should be a power of 2. In practical systems, however, $N_C$ and $N'_p$ may not always be a power of 2. Therefore, zero padding may be used to employ a fast Fourier transform. At the output, a number of last points of the obtained channel transfer function may be skipped to retain the desired estimate. By doing so, it should be noted here that the transform in the time domain must be adjusted, too, since the interpolation ratio should be $1/D_f$. The interpolation ratio defines the pilot spacing in frequency $D_f$, which is equal to the reciprocal of the ratio between the inverse DFT to the time domain and, the back transformation to the frequency domain, which is $1/D_f$.

In the following, reference is made to the least square estimators. Provided that the inverse of $D'^H_t D'_t$ does exist, the least squares estimator is given by $$\hat{h}'_{LS_i} = N'_P (D'^H_i D'_i)^{-1} \xi'_i$$
$$= (D'^H_i D'_i)^{-1} D'^H_i \tilde{Y}'_i.$$

Since the estimator depends on the transmitted signal, the pilot sequences should be properly chosen. The LS estimator exists if $D'_t$ is full rank, unfortunately this is not always the case. A necessary condition for the LS estimator to exist is $$N'_P \geq N_T Q.$$

In practice, two times oversampling provides a good trade off between minimizing the system overhead due to pilots and optimizing the performance. It is assumed that the guard interval is longer than the maximum delay of the channel.

In the following, reference is made to a Wiener filter. The Wiener filter is an estimator, which minimizes the MMSE of the received pilots. It is therefore also termed the MMSE estimator, described by a finite impulse response (FIR) filter. In general, the Wiener filter depends on the location of the desired symbol n. In order to generate the MMSE estimator, knowledge of the correlation matrices $R'_{\xi\xi}$ and $R'_{h\xi}$ is required. The MMSE estimate for OFDM symbol is given by $$\hat{h}'_i = R'_{h\xi} R'^{-1}_{\xi\xi} \xi'_i = w' \xi'_i = \frac{1}{N'_P} w' D'^H_i \tilde{Y}'_i$$
$$w' = R'_{h\xi} R'^{-1}_{\xi\xi} \quad \in C^{QN_T \times QN_T}$$

where the correlation matrices $R'_{\xi\xi}$ and $R'_{h\xi}$ are defined by $$R'_{\xi\xi} \triangleq E\{\xi'_i \xi'^H_i\} \quad \in C^{QN_T \times QN_T}$$
$$= \frac{1}{N'^2_P} D'^H_i R'_{\tilde{y}\tilde{y}} D'_i$$
$$= \frac{1}{N'^2_P} D'^H_i \tilde{X}'_i R'_{\hat{H}\hat{H}} \tilde{X}'^H_i D'_i + \frac{N_0}{N'^2_P} D'^H_i D'_i$$

-continued $$= \frac{1}{N_P'^2} D_i'^H D_i' R_{\tilde{h}\tilde{h}}' D_i'^H D_i' + \frac{N_0}{N_P'^2} D_i'^H D_i'$$

and $$R_{h\xi}' \triangleq E\{h_{lD_t}', \xi_l'^H\} \in \mathbb{C}^{QN_T \times QN_T}$$
$$= \frac{1}{N_P'} R_{\tilde{h}\tilde{h}}' D_i'^H D_i'$$

The co-variance in the time domain $R'_{\tilde{h}\tilde{h}}$ is related to the co-variance matrix in the frequency domain $R'_{\tilde{H}\tilde{H}}$ by $$R_{\tilde{h}\tilde{h}}' = F_{N_T}^H R_{\tilde{H}\tilde{H}}' F_{N_T}$$

Provided that the signals impinging from different transmit antennas are mutually uncorrelated, the autocorrelation matrix defined by $$R_{\tilde{h}\tilde{h}}' = E\{\tilde{h}_l' \tilde{h}_l'^H\}$$

has a block diagonal form $$R_{\tilde{h}\tilde{h}}' = diag(R_{\tilde{h}\tilde{h}}'^{(1)}, \ldots, R_{\tilde{h}\tilde{h}}'^{(N_T)}) \in \mathbb{C}^{N_T Q \times N_T Q}.$$

Moreover, the following relation holds $$R_{\tilde{h}\tilde{h}}'^{(\mu)} = \begin{bmatrix} R_{\tilde{h}\tilde{h}}'^{(\mu)} \\ 0 \end{bmatrix} \in \mathbb{C}^{N_{FFT} \times Q}$$

and $$R_{\tilde{h}\tilde{h}}' = diag(R_{\tilde{h}\tilde{h}}'^{(1)}, \ldots, R_{\tilde{h}\tilde{h}}'^{(N_T)}),$$

where 0 denotes an all zero matrix of an appropriate dimension. Again, the above equation is exactly true only for the sample spaced channel.

It should be noted that while the LS estimator requires $D'_I$ to be full rank, while the MMSE estimator requires invertability of $R_{\xi\xi}$ as seen above. For this to hold, however, $D'_I$ does not need to be full rank. Thus, the MMSE estimator can exist even if $N'_p < N_T Q$.

For the case that $D'_I$ is full rank, the inverse of $D_I'^H D_I'$ does exist. Then the Wiener filter can be simplified to $$w' = N_P' R_{\tilde{h}\tilde{h}}' \cdot [R_{\tilde{h}\tilde{h}}' + (D_i'^H D_i')^{-1} N_0]^{-1} \cdot (D_i'^H D_i')^{-1}.$$

Thus, the corresponding MMSE estimate becomes $$\hat{h}_l' = N_P' R_{\tilde{h}\tilde{h}}' \cdot [R_{\tilde{h}\tilde{h}}' + (D_i'^H D_i')^{-1} N_0]^{-1} \cdot (D_i'^H D_i')^{-1} \cdot \xi_l'.$$
$$= R_{\tilde{h}\tilde{h}}' \cdot [R_{\tilde{h}\tilde{h}}' + (D_i'^H D_i')^{-1} N_0]^{-1} \cdot \hat{h}_{LS_l}'.$$

That means that the LS estimate serves as an input for the MMSE estimator. By replacing $$D_i'^H D_i'$$

by its average in the second equality, the MMSE estimator can be made independent of the transmitted pilots obtained in $D'_I$. It can be observed that the separation of the $N_T$ signals, which is performed by the LS estimator, can be separated from the filtering tasks.

It is generally assumed that the channel taps as well as the fading of different transmit antennas are mutually uncorrelated. Then, for the sample spaced channel the autocorrelation matrix has the diagonal form $$R_{\tilde{h}\tilde{h}}' = diag(\sigma_1^{(1)^2}, \ldots, \sigma_Q^{(1)^2}, \ldots, \sigma_Q^{(N_T)^2})$$

where $$\sigma_Q^{(1)^2}$$

denotes the average received signal power of channel tap Q of the first transmit antenna.

In the following, reference is made to optimum pilot sequences. The MMSE estimator is in general dependent on the choice of the pilot symbols. However, choosing appropriate pilot sequences, the estimator becomes independent of the transmitted pilots. It is desirable to choose a set of pilot sequences, which minimizes the MMSE (i.e. the performance of the estimator) and the computational complexity of the estimator. A major computational burden of the estimator is the matrix inversion of $$D_i'^H D_i'$$

required by prior art channel estimation schemes for both the LS estimator as well as the MMSE estimator. If $$D_i'^H D_i'$$

can be diagonalized, a computational expensive matrix inversion can be avoided, that is $$D_i'^H D_i' = \tilde{F}_{N_T}^H \tilde{X}_i^H \tilde{X}_i' F_{N_T} = N_P' I \quad \in I^{N_T Q \times N_T Q}.$$

In the following, a sufficient condition will be derived which diagonalizes $$D_i'^H D_i'$$

and therefore satisfies the above equation.

In order to keep the receiver complexity to a minimum it is desirable to diagonalize $$D_i'^H D_i'.$$

Then, the LS and MMSE estimators can be grossly simplified. A necessary condition for the diagonalization is $N'_p \geq N_T Q$. The matrix $$D_i'^H D_i'$$

can be expressed as $$D_i'^H D_i' = \begin{bmatrix} I_{N'_p \times Q}^T \tilde{F}^H \tilde{X}_i'^{(1)H} \tilde{X}_i'^{(1)} \tilde{F} I_{N'_p \times Q} & \cdots & I_{N'_p \times Q}^T \tilde{F}^H \tilde{X}_i'^{(1)H} \tilde{X}_i'^{(N_T)} \tilde{F} I_{N'_p \times Q} \\ \vdots & \ddots & \vdots \\ I_{N'_p \times Q}^T \tilde{F}^H \tilde{X}_i'^{(N_T)H} \tilde{X}_i'^{(1)} \tilde{F} I_{N'_p \times Q} & \cdots & I_{N'_p \times Q}^T \tilde{F}^H \tilde{X}_i'^{(N_T)H} \tilde{X}_i'^{(N_T)} \tilde{F} I_{N'_p \times Q} \end{bmatrix}$$

where the blocks $$\tilde{F}^H \tilde{X}_i'^{(\mu)H} \tilde{X}_i'^{(m)} \tilde{F}$$

are of the dimension Q×Q.

A necessary condition for a diagonality is given by $$D_i'^{(\mu)H} D_i'^{(m)} \triangleq I_{N'_p \times Q}^T \tilde{F}^H \tilde{X}_i'^{(\mu)H} \tilde{X}_i'^{(m)} \tilde{F} I_{N'_p \times Q}$$

$$= \begin{cases} N'_p I, & \mu = m \\ 0, & \mu \neq m \end{cases}.$$

The first part is true for any pilot sequence since $$\tilde{X}_i'^{(\mu)H} \tilde{X}_i'^{(\mu)} = I \text{ and } I_{N'_p \times Q}^T \tilde{F}^H \tilde{F} I_{N'_p \times Q} = N'_p I_{Q \times Q}.$$

In the following, a sufficient condition to satisfy the above equation is derived. It is useful to examine the components of the vector $\xi_{l,n}$. Without loss of generality, it is assumed that the signal from antenna 1 is to be estimated. Then, the entry of $\xi_{l,n}^{(1)}$ is in the form $$\xi_{l,n}^{(1)} = \frac{1}{N'_P} \sum_{\mu=1}^{N_T} \sum_{\tilde{i}=1}^{N'_P} \tilde{X}_{l,\tilde{i}}^{(1)*} \tilde{X}_{l,\tilde{i}}^{(\mu)} e^{j2\pi \cdot (\tilde{i}-1) \cdot (n-1)/N'_P} \sum_{q=1}^{Q} \tilde{h}_{l,q}^{(\mu)} e^{-j2\pi \cdot (\tilde{i}-1) \cdot (q-1)/N'_P} +$$

$$\frac{1}{N'_P} \sum_{\tilde{i}=1}^{N'_P} \tilde{X}_{l,\tilde{i}}^{(1)*} \tilde{N}_{l,\tilde{i}} e^{j2\pi \cdot (\tilde{i}-1) \cdot (n-1)/N'_P}, \quad n = \{1, \ldots, Q\}$$

Rearranging the terms of the above equation yields $$\xi_{l,n}^{(1)} =$$

$$\frac{1}{N'_P} \sum_{\mu=1}^{N_T} \sum_{q=1}^{Q} \tilde{h}_{l,q}^{(\mu)} \sum_{\tilde{i}=1}^{N'_P} \tilde{X}_{l,\tilde{i}}^{(1)*} \tilde{X}_{l,\tilde{i}}^{(\mu)} e^{j2\pi \cdot (\tilde{i}-1) \cdot (n-q)/N'_P} + \tilde{n}_{l,n} \; n = \{1, \ldots, Q\}$$

where $\tilde{n}_{l,n}$ represents an average white Gaussian noise (AWGN) process, which is generated from $\tilde{N}_{l,\tilde{i}}$ by pre-multiplication with $$\tilde{X}_{l,\tilde{i}}^{(1)}$$

followed by an IDFT. The terms within the innermost sum are basically an IDFT of $$\tilde{X}_{l,\tilde{i}}^{(1)*} \tilde{X}_{l,\tilde{i}}^{(\mu)}.$$

Before investigating the Fourier transform properties of the transmitted pilot sequences further, a DFT of an arbitrary sequence is defined by $$F_N(x_n)_k \triangleq \sum_{n=1}^{N} x_n e^{-j2\pi k \cdot (n-1)/N} \quad k = \{0, \ldots, N-1\}.$$

Furthermore, the following series is defined $$f_N(k) \triangleq \frac{1}{N} \sum_{\tilde{n}=0}^{N-1} e^{-j2\pi n k/N}$$

$$= \frac{\sin(\pi k)}{N \sin(\pi k/N)} \cdot e^{-j\pi k \cdot (N-1)/N} = \delta_k \quad \text{for } 1 \leq k < N$$

where $\delta_k$ denotes the unit impulse function, defined by $$\delta_k \triangleq \begin{cases} 1; & k = 0 \\ 0; & \text{elsewhere} \end{cases}$$

where $1 \leq k < N_T$ is an arbitrary constant. Hence, the following is obtained $$\xi_{\tilde{l},n}^{(1)} = \frac{1}{N_P'} \sum_{\mu=1}^{N_T} \sum_{q=1}^{Q} \tilde{h}_{\tilde{l},q}^{(\mu)} F_{N_P'} (\tilde{X}_{\tilde{l},\tilde{i}}^{(1)*} \tilde{X}_{\tilde{l},\tilde{i}}^{(\mu)})_{q-n} + \tilde{n}_{\tilde{l},n}$$

It can be seen that a sufficient condition for the orthogonality of $\xi_{\tilde{l},n}^{(1)}$ is to choose a set of pilot sequences with the following properties $$F_{N_P'}(\tilde{X}_{\tilde{l},\tilde{i}}^{(1)*} \tilde{X}_{\tilde{l},\tilde{i}}^{(\mu)})_{q-n} = c\delta_{n-q-kQ},$$

where c>0 is an arbitrary constant. In this case, the following simplification is obtained $$\xi_{\tilde{l},n}^{(1)} = \sum_{q=1}^{Q} \tilde{h}_{\tilde{l},q}^{(1)} \delta_{n-q} + \tilde{n}_{\tilde{l},n} = \tilde{h}_{\tilde{l},n}^{(1)} + \tilde{n}_{\tilde{l},n} \quad \text{for } n = \{1, \ldots, Q\}, Q \leq N_P'/N_T.$$

Note that this condition is equivalent to diagonalizing $$D_{\tilde{i}}'^H D_{\tilde{i}}'.$$

By examining the DFT properties of orthogonal sequences such as Hadamard sequences, it can be shown that the above equation also is satisfied. Furthermore, the set of phase shifted sequences $$\tilde{X}_{\tilde{l},\tilde{i}}^{(\mu)} = e^{-j2\pi \cdot (\tilde{i}-1) \cdot (\mu-1)/N_T}; \quad \mu = \{1, \ldots, N_P'\}$$

also satisfies the above equation, as will be shown in the following. These phase-shifted sequences may also be utilized to further simplify the receiver structure. The DFT of $$\tilde{X}_{\tilde{l},\tilde{i}}^{(l)*} \tilde{X}_{\tilde{l},\tilde{i}}^{(\mu)}$$

is given by $$F_{N_P'}(\tilde{X}_{\tilde{l},\tilde{i}}^{(l)*} \tilde{X}_{\tilde{l},\tilde{i}}^{(\mu)})_{q-n} = N_P' f_{N_P'}(n - q - (\mu-1)N_P'/N_T) = N_P' \delta_{n-q-(\mu-1)N_P'/N_T}.$$

Hence, the desired result for $$\xi_{\tilde{l},n}^{(1)}$$

is obtained $$\xi_{\tilde{l},n}^{(1)} = \sum_{\mu=1}^{N_T} \sum_{q=1}^{Q} \tilde{h}_{\tilde{l},q}^{(\mu)} \delta_{n-q-(\mu-1)N_P'/N_T} + \tilde{n}_{\tilde{l},n}$$

$$= \tilde{h}_{\tilde{l},n}^{(1)} + \tilde{n}_{\tilde{l},n} \quad \text{for } n = \{1, \ldots, Q\}, Q \leq N_P'/N_T.$$

Therefore, if the pilot sequences are appropriately chosen, the LS estimator as well as the MSE estimator can grossly be simplified $$w' = R_{\tilde{h}\tilde{h}}' \cdot \left[ R_{\tilde{h}\tilde{h}}' + I \frac{N_0}{N_P'} \right]^{-1}$$

$$\hat{h}_{\tilde{l}}' = w' \cdot \xi_{\tilde{l}}'$$

$$\hat{h}_{LS_{\tilde{l}}}' = \xi_{\tilde{l}}'.$$

It can be seen that the estimator has become independent of the chosen pilot sequence, which significantly simplifies the filter generation.

In the special case of a sample spaced channel, the Wiener filter becomes $$w' = \text{diag}\left( \frac{\sigma_1^{(1)2}}{\sigma_1^{(1)2} + \frac{N_0}{N_P'}}, \ldots, \frac{\sigma_Q^{(1)2}}{\sigma_Q^{(1)2} + \frac{N_0}{N_P'}}, \ldots, \frac{\sigma_Q^{(N_T)2}}{\sigma_Q^{(N_T)2} + \frac{N_0}{N_P'}} \right).$$

For the non-sample spaced channel, the optimum solution for the Wiener filter is not a diagonal matrix. However, most often a sub-optimum one-tap filter may be chosen.

Moreover, depending on certain implementation requirements of the inventive methods for estimating a channel can be implemented in hardware or in software. The implementation can be performed using a digital storage medium, in particular a disc or a CD having electronically readable control signals stored thereon, which can cooperate with a programmable computer system such that the inventive methods are performed. Generally, the present invention is, therefore, a computer-program product with a program code stored on a machine-readable carrier, the program code being for performing the inventive methods, when the computer program product runs on a computer. In other words, the inventive method is, therefore, a computer program having a program code for performing the inventive methods, when the computer program runs on a computer.

While this invention has been described in terms of several preferred embodiments, there are alterations, permutations, and equivalents which fall within the scope of this invention.

It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. An apparatus for estimating a channel from a transmitting point to a receiving point in an environment, in which at least two transmitting points spaced apart from each other are present, each transmitting point having associated therewith a pilot sequence, wherein the pilot sequences are different from each other, comprising:
    a provider for providing an input signal, the input signal including a superposition of signals from the transmitting points;
    a multiplier for providing a number of copies of the input signal, the number of copies being equal to the number of transmitting points;
    for each copy of the input signal, a transformer for transforming the copy or a signal derived from the copy to obtain a transformed signal, the transformer being operative to apply a transform algorithm, which is based on a Fourier transform; and
    for each transformed signal, an extractor for extracting a portion of the transformed signal, the portion of the transformed signal representing an estimated channel impulse response for the channel to be estimated, wherein each extractor is operative to receive a transformed signal only from an associated transformer.

2. The apparatus according to claim 1, wherein the pilot sequences are orthogonal to each other within a predetermined orthogonality range and phase shifted with respect to each other, the apparatus further comprising:
    for each extractor, a unit for processing the portion of the transformed signal extracted by an associated extractor without any knowledge of any pilot sequence.

3. The apparatus according to claim 2, wherein the unit for processing comprises an estimation filter, the estimation filter being iteratively adjusted based on portions of the transformed signal extracted from the associated extractor at different time instants, the estimation filter being operative to output an enhanced estimated channel impulse response.

4. The apparatus according to claim 3, wherein the unit for processing comprises a zero padder for zero padding the enhanced estimated channel impulse response to the predetermined length to obtain a zero padded enhanced estimated channel impulse response.

5. The apparatus according to claim 4, wherein the unit for processing further comprises a transformer for transforming the zero padded enhanced estimated channel impulse response to output a channel transfer function of the channel to be estimated.

6. The apparatus according to claim 5, wherein the apparatus further comprises a frequency domain window for windowing each signal derived from the copy to reduce the leakage effect and providing the resultant signal to a corresponding transformer, and wherein the apparatus further comprises an inverse window for windowing an output of the corresponding transformer to reduce an influence of the frequency domain window in the channel transform function of the channel to be estimated.

7. The apparatus according to claim 1, further comprising, for each copy of the transformed signal, a pre-multiplier that is connected between the multiplier and each transformer to generate the signal derived from the copy, the pre-multiplier being operative to pre-multiply the corresponding of the input signal by a complex conjugate version of a pilot sequence associated with a transmitting point defining the channel to be estimated to obtain a pre-multiplied input signal.

8. The apparatus according to claim 1, wherein the extractor is operative to extract values from the transformed signal being greater than a pre-determined threshold.

9. An apparatus for estimating a channel from a transmitting point to a receiving point in an environment, in which at least two transmitting points spaced apart from each other are present, each transmitting point having associated therewith a pilot sequence, wherein the pilot sequences are different from each other, comprising:
    a provider for providing an input signal, the input signal including a superposition of signals from the transmitting points;
    a transformer for transforming the input signal to obtain a transformed signal, the transformer being operative to apply a transform algorithm, which is based on a Fourier transform;
    a multiplier for providing a number of copies of the transformed signal, the number of copies being equal to the number of transmitting points;
    for each copy of the transformed signal, an extractor for extracting a portion of the copy of the transformed signal, the portion of the copy of the transformed signal representing an estimated channel impulse response for the channel to be estimated.

10. A method for estimating a channel from a transmitting point to a receiving point in an environment, in which at least two transmitting points spaced apart from each other are present, each transmitting point having associated therewith a pilot sequence, wherein the pilot sequences are different from each other, comprising:
    providing an input signal, to a multplier the input signal including a superposition of signals from the transmitting points;
    using a multiplier to generate a number of copies of the input signal, the number of copies being equal to the number of transmitting points;
    for each copy of the input signal, transforming the copy or a signal derived from the copy to obtain a transformed signal by applying a transform algorithm, which is based on a Fourier transform; and
    for each transformed signal, extracting a portion of the transformed signal, using an extractor the portion of the transformed signal representing an estimated channel impulse response for the channel to be estimated, wherein only an associated transformed signal is used when extracting the portion of the transformed signal.

11. A method for estimating a channel from a transmitting point to a receiving point in an environment, in which at least two transmitting points spaced apart from each other are present, each transmitting point having associated therewith a pilot sequence, wherein the pilot sequences are different from each other, comprising:
    providing an input signal, the input signal including a superposition of signals from the transmitting points;
    transforming the input signal to obtain a transformed signal by applying a transform algorithm, which is based on a Fourier transform;
    providing the transformed signal to a multiplier to generate a number of copies of the transformed signal, the number of copies of the transformed signal being equal to the number of transmitting points; and
    for each copy of the transformed signal, extracting a portion of the copy of the transformed signal, using an extractor the portion of the copy of the transformed signal representing an estimated channel impulse response for the channel to be estimated.

12. A computer readable medium having stored thereon a computer program having a program code for performing a method for estimating a channel from a transmitting point to a receiving point in an environment, in which at least two transmitting points spaced apart from each other are present, each transmitting point having associated therewith a pilot sequence, wherein the pilot sequences are different from each other, comprising: providing an input signal, the input signal including a superposition of signals from the transmitting points; providing a number of copies of the input signal, the number of copies being equal to the number of transmitting points; for each copy of the input signal, transforming the copy or a signal derived from the copy to obtain a transformed signal by applying a transform algorithm, which is based on a Fourier transform; and for each transformed signal, extracting a portion of the transformed signal, the portion of the transformed signal representing an estimated channel impulse response for the channel to be estimated, wherein only an associated transformed signal is received used when extracting the portion of the tranformation signal, when the program runs on a computer 13. A computer readable medium having stroed thereon a computer program having a program code for performing a method for estimating a channel from a transmitting point to a receiving point in an enviromental, in which at least two transmitting points spaced apart from each other are present, each transmitting having associated therewith a pilot sequence, wherein the pilot sequences are different from each other, comprising: providing an input signal, the input signal including a superposition of signals from the transmitting points; transforming the input signal to obtain a transformed signal by applying a transform algorithm, which is based on a Fourier transform; providing a number of copies of the transformed signal, the number of copies of the transformed signal being equal to the number of transmitting points; and for each copy of the transformed signal, extracting a portion of the copy transformed signal, the portion of the copy of the transformed signal representing an estimated channel impulse response for the channel to be estimated, when the program runs on a computer.

* * * * *